(12) United States Patent
Howland

(10) Patent No.: US 7,393,588 B1
(45) Date of Patent: Jul. 1, 2008

(54) FLEXIBLE PENETRATION RESISTANT COMPOSITE MATERIALS STRUCTURE WITH CRITICAL GAP GEOMETRY IN A SOLIDS LAYER

(75) Inventor: Charles A. Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 456 days.

(21) Appl. No.: 10/975,558

(22) Filed: Oct. 28, 2004

Related U.S. Application Data

(60) Provisional application No. 60/515,194, filed on Oct. 28, 2003.

(51) Int. Cl.
*B32B 17/10* (2006.01)
*B32B 27/00* (2006.01)

(52) U.S. Cl. ................ 428/415; 428/332; 428/340; 428/911

(58) Field of Classification Search ............. 428/292.1, 428/416, 340, 332; 442/134
See application file for complete search history.

(56) References Cited

U.S. PATENT DOCUMENTS

| 5,198,280 A | 3/1993 | Harpell et al. |
| 2002/0122927 A1* | 9/2002 | Howland ............. 428/292.1 |

OTHER PUBLICATIONS

PCT Search Report dated Mar. 7, 2005 of Patent Application No. PCT/US04/35784 filed Oct. 28, 2004.

* cited by examiner

*Primary Examiner*—Lynda Salvatore
(74) *Attorney, Agent, or Firm*—Vern Maine & Associates

(57) ABSTRACT

A flexible, penetration resistant structure has a solids layer with a pattern of intersecting gap lines with critical gap cross section geometry, a flexible fiber or fabric layer backing, and a critical bonding layer attaching the solids layer to the flexible backing layer; where the gap geometry upon impact by a select penetrator type causes a controlled response and distributes impact energy in the structure, placing elements of the solids layer adjacent to the impact point mainly in vertical and lateral compression, the bonding layer mainly in shear, the fabric layer beneath the point of impact mainly in bending pressure, and the fibers within the fabric layer, particular those fibers perpendicular to the axis of the gap segment impacted, mainly in tension; and where the applicable class of penetrators is loosely defined as within a certain range of striking energy per unit area of penetrator contact area cross section.

39 Claims, 15 Drawing Sheets

→ 212
→ 213

FLEXIBLE PENETRATION RESISTANT COMPOSITE MATERIALS STRUCTURE WITH CRITICAL GAP GEOMETRY IN A SOLIDS LAYER

This application claims the benefit of U.S. Provisional Applications No. 60/515,194, filed Oct. 28, 2003.

FIELD OF INVENTION

This invention relates to protective systems for shielding human users from strikes by selected types of penetrators, and in particular to composite material structures providing adequate flexibility for average human anatomical proportions and ranges of motion, having penetration resistance qualities sufficient to protect against a class of penetrators loosely defined as being within a limited range of striking energy per unit area of penetrator contact area cross section as is further explained below.

BACKGROUND OF INVENTION

The use of solid inflexible materials for penetration-protective applications is well known. Many metallic and ceramic materials have been developed for these applications. Additional there are a wide range of fiber based flexible webs that have protective properties with respect to potential penetrators of all types. Woven and laminated high strength fiber has wide application for protective garments and other products. There has been little work in creating high performance composite material systems that consist of solids and fiber webs in assembled combinations. There are many penetrator-protective applications that have been shown to require the hardness and toughness that the solids provide. The fiber based webs are preferred because the fiber provides for a degree of flexibility and compliance that is highly desirable for some users.

Among the prior art, Harpell's U.S. Pat. No. 5,198,280 provides a comprehensive description of a multi-layer, multi-axis fiber structure for penetration resistance, and further describes various compositions and materials for rigid bodies of various geometry sizes and patterns that can be attached in a multi-layer, overlapping pattern that will enhance the protective qualities of the structure or panel. Harpell discloses that the fiber layers can be attached together by various means, and that the rigid bodies can be attached by various means including adhesives, bolts, screws, staples and mechanical interlocks to and within the flexible fabric layers. Harpell speaks to geometric patterns of rigid bodies and seams in multiple directions in the layered structure for flexibility. Harpell also mentions that rigid planar bodies may be attached to the fabric at points away from their edges, allowing the edges to separate from the fibers during flexing.

SUMMARY OF THE INVENTION

However, Harpell is quiet with respect to the particular benefits of the instant invention where a penetration resistant solid-fiber composite structure and system consists of a solid layer where segments of a solid material are positioned adjacent to each other with great precision to define a pattern of flex lines of critical gap width and height/width ratio between solid segments, where the solids layer is fully adhered to an underlying flexible fiber substrate. The bonding layer between the solids layer and the flexible fiber layer is sufficient to assure the integrity of the critical gap during a strike by a select penetrator so that it executes a closing action against further penetration. The fiber threadlines in the flexible layer are intentionally oriented perpendicular to the direction or axial orientation of the gap line segments, so that the solid-fiber composite takes a strike on or near a gap in the solids layer in a manner that distributes the force first along edges of the solid abutting the gap segment with its particular axis of orientation, and hence across a substantial number of cross-axis fibers within the fiber layer which absorb the distributed force further along their length by their tensile strength.

The invention therefore addresses the integration of solids and fiber webs into a penetrator-protective composite material with useful properties. The structure disclosed allows for a composite structure that delivers both the flexibility of fiber-based materials and the protective performance of solid materials.

In order for a solid-fiber composite material to have a useful degree of flexure, the rigid component or solid layer of the composite must be discontinuous. In practice for the composite to have a significant degree of flex, the discontinuity must have appreciable dimensions; this gap or break between rigid elements is the characteristic that allows for flex. A gap pattern for flex may be complex or may be as simple as a single hinge or flex line. At the same time, it is this gap or break in continuity between the rigid elements that will be most vulnerable to strikes and penetration. For purposes of this disclosure, critical gap design and performance can be best appreciated by contemplating a cross section of gap where a strike might occur. The geometry of the gap in the solid component of the invention, in the context of the class of anticipated penetrators, is clearly critical to its performance potential. Too small a gap width provides too little flexibility, while too large a gap width creates too much vulnerability. Other structural factors of the solid/fiber composite material of the invention make the analysis more interesting, as is described below.

The main goal of the invention is to provide a flexible, penetration resistant, composite materials structure consisting of at least a solids layer with a pattern of intersecting gap lines where each line has a critical gap cross section geometry, at least a first underside flexible fiber or fabric layer, and a non-elastic, critical bonding layer or mechanism attaching the solids layer to the flexible fiber or fabric layer; where the gap geometry upon impact by a select penetrator type distributes impact energy between the components of the structure, placing elements of the solids layer adjacent to the impact point mainly in vertical and lateral compression, the bonding layer mainly in shear, the fabric layer beneath the point of impact mainly in bending pressure, and the fibers within the fabric layer perpendicular to the axis of the gap segment impacted mainly in tension.

It is a further objective of the invention to provide a flexible composite material structure or system for protecting a generally soft bodied host such as a human being from penetration from a select class of penetrator threats, where the composite material has a pre-engineered energy absorption reaction to a penetrator strike. Accordingly, there is here disclosed a composite material structure comprising a solid component layer, a critical gap geometry and gap pattern in the solid component layer, a suitable fiber component layer inboard of the solid component layer where the fiber layer is arranged with a generally perpendicular threadline orientation to the gap axis, and where the solid component layer is adequately bonded to the fiber component layer so as to prevent or limit the destructive distortion of the gap during flexure and penetrator strikes and to promote the effective response of the structure during an actual penetrator strike.

DETAILED DESCRIPTION OF PREFERRED EMBODIMENTS

Figure 1:
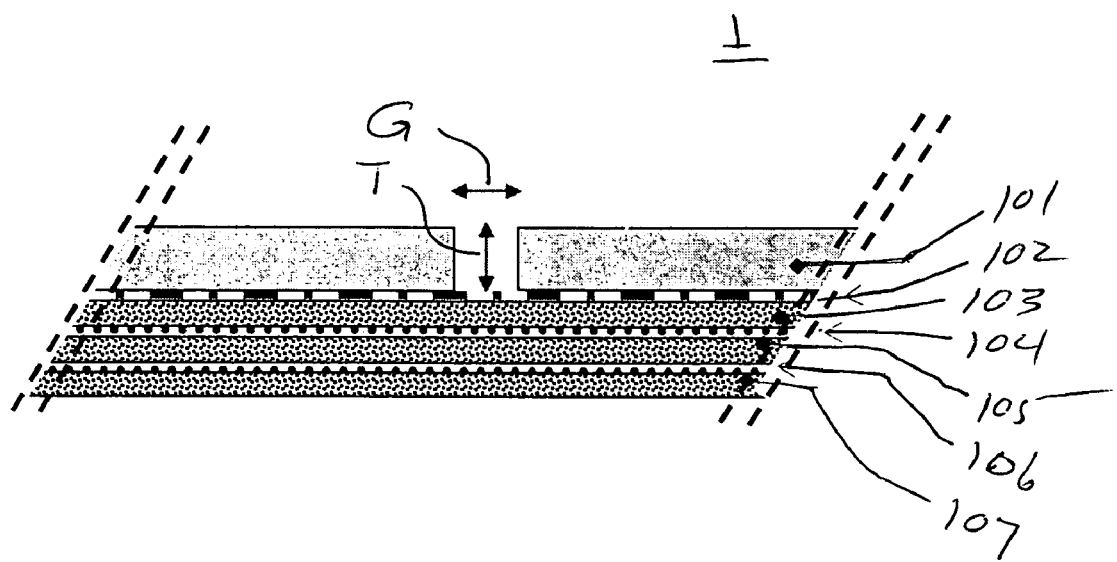
FIG. 1 is a diagrammatic cross section of a portion of a primary solid/fiber composite structure embodiment of the invention.

The design of the critical gap in the solid component of the composite material is described. The use of relatively thin solid layers is preferred in order to allow for small critical gaps. Solid thickness of 0.005 to 0.04 inches are preferred, with preferred gap dimensions of between 50% and 400% of the thickness of the solid.

The design of the fiber layers component of the composite material is equally important as the solid layer component in the control of the critical gap. The elongation and tensile properties of the fabric layers must be aligned to the critical gap line or axis. Because the gap axis is not always aligned to the typical 0 and 90 degree threadlines common in wovens and fabric laminates, bias laminates are disclosed and found to be useful for alignment control of thread-line to the critical gap axis and pattern. The term fabric layer as used herein can be interpreted as plural and inclusive of multiple fabric or yarn sheet layers or laminates, where a yarn sheet is a planar array of threads or fibers or fiber bundles aligned in a common threadline direction and spaced uniformly apart.

The attachment of the solids component to the fiber component webs within the composite material can be mechanical, however adhesive bonding between these components has been shown to provide superior results, although a combination may be used in some embodiments. When well selected solid and fiber layers are assembled with an appropriate initial critical gap and gap pattern using high strength adhesive bonding, the resulting composite material has been shown to maintain the critical gap geometry and protective capability in use, accommodating many cycles of flexure and repelling repeated penetrator strikes at different areas along the gap axis.

Solid/Fiber Composite Structure—Preferred Embodiments

There are a number of different threats that solid-fiber composites are designed to address. Threat types including edged weapons $P_e$, and round penetrators $P_p$, are matched to preferred embodiment solid-fiber composite examples of the invention in Table #1 below. These examples all use: a fiber layer with threadline running within 30 degrees. of perpendicular to the gap; resin based, inter-fiber continuous all area bonding (other than areas of gap) at interface of solid and adjacent fiber layer; continuous all area bonding between any additional adjacent fabric layers making up the bonded composite of solid and fabric; and high tenacity fiber layers that are un-bonded behind the bonded composite. To further improve the penetration resistance of the assembly, a bonded cover layer can be used. This cover layer or layers are of low modulus stretch materials and are designed to not interfere with the flex of the assembly across the critical gaps.

Referring to Table #1 below, fiber types, fiber or fabric layer location, denier and ends per inch count in both machine and cross machine directions, and tensile strength is shown for various embodiments.

TABLE #1

| | | Fiber characteristics of the fiber layers | | | |
| Fiber type | Fabric location | Machine Direction Denier | Cross Machine Denier | EPI MD | EPI CMD | Tensile strength |
| --- | --- | --- | --- | --- | --- | --- |
| Para Aramid | Bonded backer | 840 | 840 | 28 | 28 | 32 gpd |
| Para Aramid | Bonded backer | 200 | 200 | 60 | 60 | 23 gpd |

TABLE #1-continued

Fiber characteristics of the fiber layers

| Fiber type | Fabric location | Machine Direction Denier | Cross Machine Denier | EPI MD | EPI CMD | Tensile strength |
|---|---|---|---|---|---|---|
| LCP Vectran | Bonded backer | 1500 | 1500 | 14 | 14 | 25 gpd |
| UHMWPE Ballistic type | Un Bonded Backer | 650 | 650 | 30 | 30 | 28 gpd |
| Para Aramid Staple Knife spike type | UnBonded Backer | 70/2 | 70/2 | 73 | 73 | 5 gpd |
| Para Aramid Ballistic type | UnBonded backer | 840 | 840 | 28 | 28 | 23 gpd |
| Lycra/nylon | Bonded elastic cover | 70 d/210 d | 70 d/210 d | 50 | 50 | 5 gpd |
| Rubber core cotton cover | Bonded elastic cover | 300 d | 300 d | 50 | 50 | 3 gpd |
| Nylon | Bonded elastic cover | 40 d | 40 d | 30 | 30 | 7 gpd |

Referring to Tables #2-4 below, for each example described, the solid layer material and thickness, and the gap edge configuration between platelet-like areas of the solid layer are shown, as well as the width of the critical gap as a percentage of solid layer thickness. The range of solid to fiber layer bond area between gaps is shown, as are the means of attachment of the various layers. Relative penetrator resistance is shown in qualitative terms, and bending flex.

Means of attachment of layers includes mechanical fasteners as well as adhesive bonding. The types of mechanical attachments that can be used to assembly the individual plates of the solids layer to fiber layers are infinite. However the contact area between the fiber layer and the assembly fastener is important. For simplicity in description of the invention we have grouped the mechanical fasteners into two groups: ring type; and post type. The ring type contacts at least two points in a solid piece and at least two points in the flexible backer layer. The post type fastener is discrete and contacts only a single point in a solid piece and the flexible backer layer. The ring type provides more pattern stability in the solids layer and holds the critical gap geometry more uniform throughout the material, by preventing rotation of the solid layer elements and improved resistance to peel forces between the solid layer and backer layer. In either case a preferred embodiment is the combined use of both mechanical fastener and an adhesive bonding system. The mechanical attachment and the adhesive bond work together to control the critical gap.

Figure 14A:
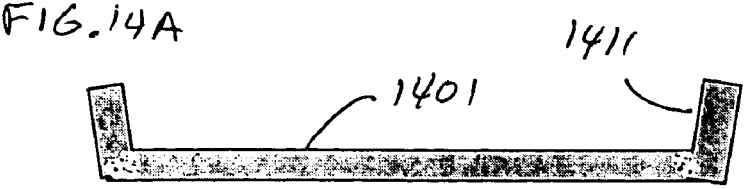
FIGS. 14A-14D are cross section illustrations of a hemmed edge solids layer part, variously reinforced for penetration resistance and gap edge reinforcement.
Figure 14B:
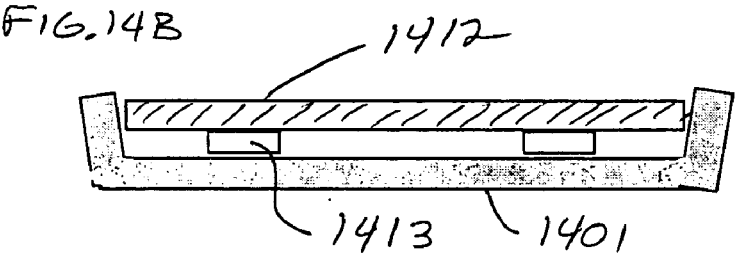
Figure 14C:
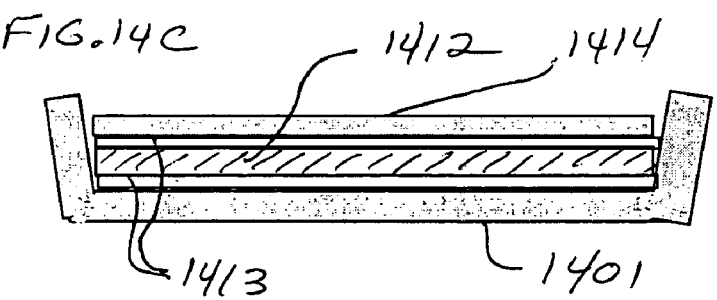
Figure 14D:
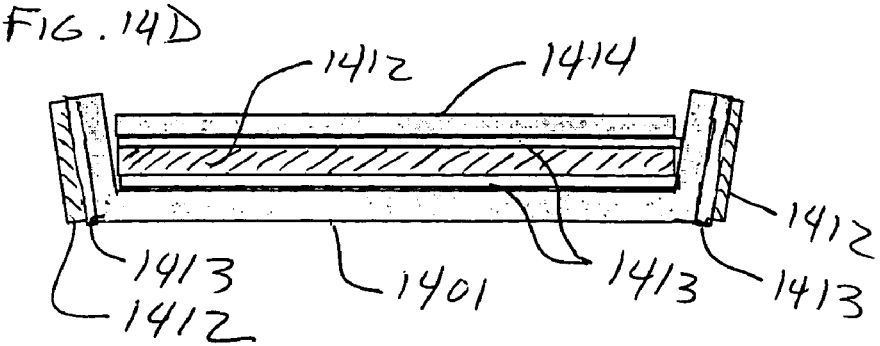

Solids Types:

Referring to FIGS. 14A-D, there is shown in cross section in FIG. 14A a hemmed edge solid part 1401, with its upturned edge 1411 having less than a 90 degree bend, as is further explained below. In FIG. 14B, hemmed edge solid part 1401 is configured with a solid insert 1412, which is bonded into place by bonds 1413. In FIG. 14C, the embodiment of FIG. 14B is further modified to have a high hardness cap 1414 bonded to solid insert 1412 by bond 1413. And in FIG. 14D, the hemmed edge is likewise configured with a solid insert 1412 bonded to the edge by bond 1413, as a reinforcement of the critical gap.

TABLE #2

Knife and spike resistant Solid-Fiber Composite Configurations

| Example & penetrator type | Solid Material | Solid layer thickness | Solid edge | Gap type | Solid-fiber bond area | Bonded backer Fiber layer tensile | Mechanical attachment | High stretch bonded cover layer | Penetrator performance | Bending flex |
|---|---|---|---|---|---|---|---|---|---|---|
| 1 knife | A S. Steel/titanum | 0.01-0.04" full hard | Square | 50%-400% | 0.5-1.0 inch 2 | 23-35 gpd | None | Yes | Gap control good | Preferred |
| 3 knife | A S. Steel/titanum | 0.01-0.04" full hard | Square | 50%-400% | 0.375-1.0 inch 2 | 23-35 gpd | Solid to fiber ring type | Yes | Gap control good | Preferred |
| 3 knife | A S. Steel/titanum | 0.01-0.04" full hard | Square | 50%-400% | 0.375-1.0 inch 2 | 23-35 gpd | Solid to fiber ring type | | Gap control good | |
| 4 knife | A S. Steel/titanum | 0.01-0.04" full hard | Square | 50%-400% | 0.375-1.0 inch 2 | 23-35 gpd | Solid to fiber post type | Yes | Gap control poor | Preferred |
| 5 knife | A S. Steel | Overlapping | Square | Unbonded zone | 0.375-1.0 inch 2 | 23-35 gpd | Solid to fiber post type | | Gap control poor | |

TABLE #2-continued

Knife and spike resistant Solid-Fiber Composite Configurations

| Example & penetrator type | Solid Material | Solid layer thickness | Solid edge | Gap type | Solid-fiber bond area | Bonded backer Fiber layer tensile | Mechanical attachment | High stretch bonded cover layer | Penetrator performance | Bending flex |
|---|---|---|---|---|---|---|---|---|---|---|
| 6 knife | A S. Steel/titamum | 0.01-0.04" full hard | Fabricated | 50%-400% | 0.5-1.0 inch 2 | 23-35 gpd | none | Yes | Gap control best | |
| 7 knife | A S. Steel | 0.01-0.04" full hard | Forges molded | 50%-400% | 0.5-1.0 inch 2 | 23-35 gpd | none | Yes | Gap control best | |
| 8 knife | A S. Steel With ceramic or martinsite insert | 0.01-0.04" full hard | Bent or hemmed w/o insert | 50%-400% | 0.5-1.0 inch 2 | 23-35 gpd | nono | Yes | Gap control best | |
| 9 not preferred for knife | A S. Steel/ceramic | Multi layer | Square | 50%-400% | 0.5-1.0 inch 2 | 23-35 gpd | none | Yes | | |
| 10 not preferred for knife | A S. Steel/ceramic | Simple | Wrapped edge | 50%-400% | 0.5-1.0 inch 2 | 23-35 gpd | none | Yes | | |
| 11 not preferred for knife | A S. Steel/titamum | Simple solid staggered in fiber | Square | 50%-400% | 0.5-1.0 inch 2 | 23-35 gpd | none | Yes | Gap control poor | |

Ballistic threats $P_b$ are matched to preferred embodiment examples of the invention in Table #2, below. All of the examples from Table #2 use: a fiber layer with threadlines running within 30 degrees of perpendicular to the gap, resin based; continuous all area bonding (other than gap areas at the interface of the solid layer to the adjacent fiber layer; continuous all area bonding between any additional adjacent fabric layers making up the bonded composite of solid and fabric; high tenacity fiber layers that are not bonded, behind the bonded composite of the solid and selected fiber layers; and high tenacity fiber layers that are not bonded, in front of the solid layer so as to be struck first by a penetrator.

TABLE #3 for Ballistic application of Solid-Fiber composite

| Example & penetrator type | Solid Material | Solid layer | Solid edge | Gap type | Solid Bending stiffness | Bonded backer Fiber layer tensile | Mechanical attachment | High stretch bonded cover layer | Penetrator performance | Bending flex |
|---|---|---|---|---|---|---|---|---|---|---|
| 1 ballistic | A S. or MS Steel/ceramic | Simple | Square | 100-500% 2-5 mm | Fair-good wearability | 23-35 gpd | none | Yes | Gap control good | Preferred |
| 2 ballistic | A S. or MS Steel/ceramic | Multi layer steel/ceramic/steel | Square | 100-500% 2-5 mm | Fair-good wearability | 23-35 gpd | none | Yes | Gap control good | Preferred |
| 2 ballistic | ceramic bonded to fiber | Multi layer | Square | 100-500% 2-5 mm | Fair-good wearability | 23-35 gpd | none | Yes | Gap control good | Preferred |
| 3 ballistic not preferred | A S. Steel/ceramic | Simple | Square | 100-500% | | 23-35 gpd | Solid to solid ring type | | Gap control good | |
| 3 ballistic | A S. Steel/ceramic | Simple | Square | 100-500% | | 23-35 gpd | Solid to fiber ring type | | Gap control good | |
| 4 ballistic not preferred | A S. Steel/ceramic | Simple | Square | 100-500% | | 23-35 gpd | Solid to fiber post type | | Gap control good | Preferred |
| 5 Ballistic | A S. Steel/ceramic | Overlapping | Square | Unbonded zone | Highest stiffness (poor wearability) | 23-35 gpd | Solid to fiber post type | | Gap control poor | Not preferred |
| 6 ballistic not preferred | A S. Steel/ceramic | Simple | Fabricated 2-7 mm | 100-500% | Fair-good wearability | 23-35 gpd | none | Yes | Gap control best | |

TABLE #3-continued for Ballistic application of Solid-Fiber composite

| Example & penetrator type | Solid Material | Solid layer | Solid edge | Gap type | Solid Bending stiffness | Bonded backer Fiber layer tensile | Mechanical attachment | High stretch bonded cover layer | Penetrator performance | Bending flex |
|---|---|---|---|---|---|---|---|---|---|---|
| 7 Ballistic | A S. Steel/ titanium | Simple | Forges molded | 100-500% | Highest | 23-35 gpd | none | Yes | Gap control best | |
| 8 Ballistic | A S. Steel/ titanium | Simple | Bent | 100-500% | Highest | 23-35 gpd | nono | Yes | Gap control best | |
| 9 Ballistic | A S. Steel/ ceramic | 2 or more solid layers Separated by fiber | Square | 100-500% | Highest | 23-35 gpd | none | Yes | | |
| 10 Ballistic | A S. Steel/ ceramic | Simple | Wrapped edge | 100-500% | | 23-35 gpd | none | Yes | | |
| 11 Ballistic | A S. Steel | Simple solid staggered in fiber | Square | 100-500% | | 23-35 gpd | none | Yes | Gap control poor | |

Ultra High Pressure Water jets (UHPW), referenced in the figures as penetrator $P_j$, are matched to preferred embodiment examples of the invention in Table #3, below. All examples in the table use: a fiber layer having threadlines running within 30 degrees of perpendicular to the gap, continuous, wide area bonding (other than gap area) at the interface of the solid and first fiber layer of the solid and fiber bonded composite; at least one high tenacity fiber layer that is not bonded, behind the bonded composite; and one low tenacity fiber layers high stretch, at least one layer, bonded, in front of the solid layer so as to be first struck by a penetrator.

TABLE #4 for Ultra High pressure water application

| Example & penetrator type | Solid Material | Solid layer | Solid edge | Gap type | Solid Bending stiffness | Fiber layer tensile | Mechanical attachment | High stretch bonded cover layer | Penetrator performance | Bending flex |
|---|---|---|---|---|---|---|---|---|---|---|
| 1 UHPW | Aluminum or SS 0.01-0.05" | 0.01-0.04" full hard | Square | 100% | Preferred Fair-good wearability | 10-35 gpd | none | Yes | Gap control good | Preferred |
| 3 UHPW | Aluminum or SS 0.01-0.05" | 0.01-0.04" full hard | Square | 100% | Fair-good wearability | 10-35 gpd | Solid to solid ring type | | Gap control good | |
| 3 UHPW | Aluminum or SS 0.01-0.05" | 0.01-0.04" full hard | Square | 100% | Fair-good wearability | 10-35 gpd | Solid to fiber ring type | | Gap control good | |
| 4 UHPW | Aluminum or SS 0.01-0.05" | 0.01-0.04" full hard | Square | 100% | Fair-good wearability | 10-35 gpd | Solid to fiber post type | | Gap control good | Preferred except for cost |
| 5 UHPW | Aluminum or SS 0.01-0.05" | Over-lapping | Square | Unbonded zone | Poor wearability | 10-35 gpd | Solid to fiber post type | | Gap control poor | |
| 6 Not preferred UHPW | Aluminum or SS 0.01-0.05" | 0.01-0.04" full hard | Fab-ricated | 100% | | 10-35 gpd | none | Yes | Gap control best | |
| 7 Not preferred UHPW | Aluminum or SS 0.01-0.05" | 0.01-0.04" full hard | Forges molded | 100% | | 10-35 gpd | none | Yes | Gap control best | |
| 8 Not preferred UHPW | Aluminum or SS 0.01-0.05" | 0.01-0.04" full hard | Bent | 100% | | 10-35 gpd | nono | Yes | Gap control best | |
| 9 Not preferred UHPW | Aluminum or SS 0.01-0.05" | Multi layer2 or more solid layers Separated by fiber | Square | 100% | Poor wearability | 10-35 gpd | none | Yes | | |

TABLE #4-continued for Ultra High pressure water application

| Example & penetrator type | Solid Material | Solid layer | Solid edge | Gap type | Solid Bending stiffness | Fiber layer tensile | Mechanical attachment | High stretch bonded cover layer | Penetrator performance | Bending flex |
|---|---|---|---|---|---|---|---|---|---|---|
| 10 Not preferred UHPW | Aluminum or SS 0.01-0.05" | Simple | Wrapped edge | 100% | | 10-35 gpd | none | Yes | | |
| 11 UHPW | Aluminum or SS 0.01-0.05" | Simple solid staggered in fiber | Square | 100% | | 10-35 gpd | none | Yes | Gap control poor | |

Figure 12:
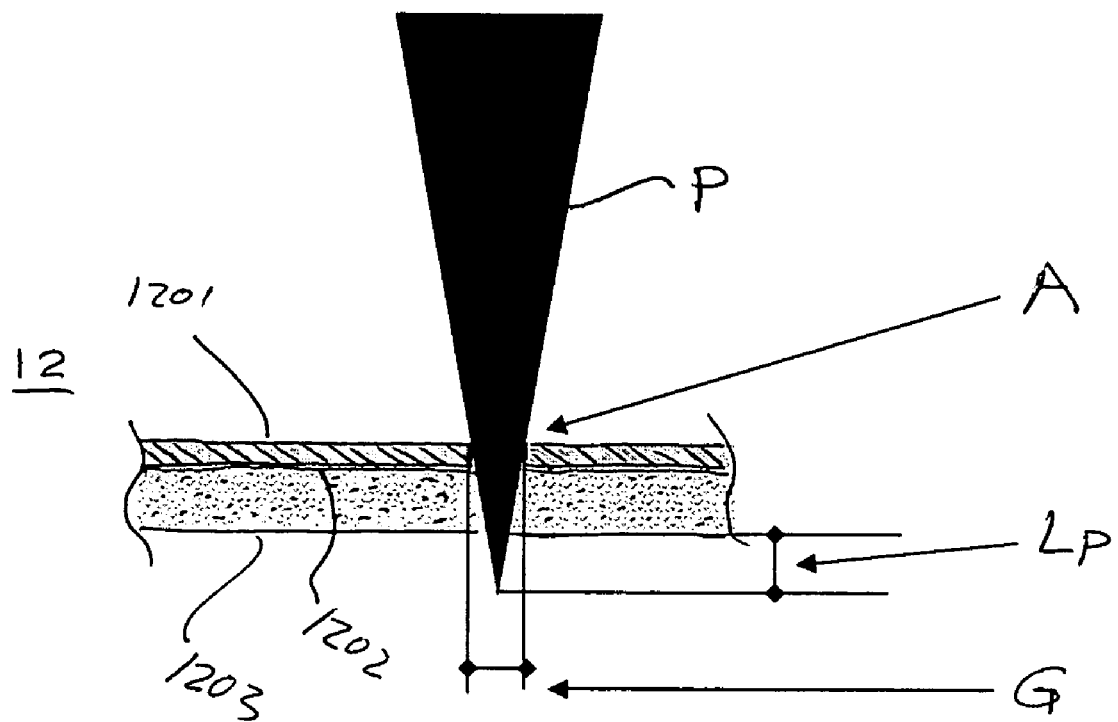
FIG. 12 is a diagrammatic cross section of an embodiment, illustrating the profile of a penetrator and its relationship to gap width and depth of penetration.

Consideration of Solid Layer Thickness, Gap Width, and Aerial Density:

In the preferred embodiments there are many common elements. The critical gap must have a set relationship with the geometry of the threat penetrator. In all of the cases of knives, round penetrators and UHPW (Ultra High Pressure Water), the size of the penetrator and the typical allowed depth of penetration through the protective structure for human users (6 mm in most specifications) determines the critical gap width dimension should be less than 0.050 inches, in the context of the structures discussed. Referring to FIG. 12, protective structure 12 consists of solids layer 1201 bonded by bonding layer 1202 to fabric layer 1203. Penetrator P pierces the protective structure 12 at a critical gap A to the engineered maximum extent of allowed penetration through the structure, length $L_p$. The allowable width of penetration; dimension G, is the critical gap dimension between solids segments; and the width of the penetrator at the point of interference. This critical gap limit of 0.050 inches matches the critical penetrator width for many defined threats. Readers are referred to the National Institute of Justice, including NIJ Standard 0015, for related standards and other information.

In addition to the penetrator derived gap width limit, there is a practical aerial density limit for the solid layer. Because hard, tough solids have a high specific gravity, the allowable thickness for a solid in a garment application is low. For materials having a specific gravity of 7, as is typical for steel, the limit for thickness of the solid component layer is approximately 0.025 inches in order to maintain a total system weight of less than 1 lb/ft² (pound per square foot). It has been found that, given the correct bonding process and fiber layer, solids of this thickness provide protection for many important penetrator threats.

Figure 8:
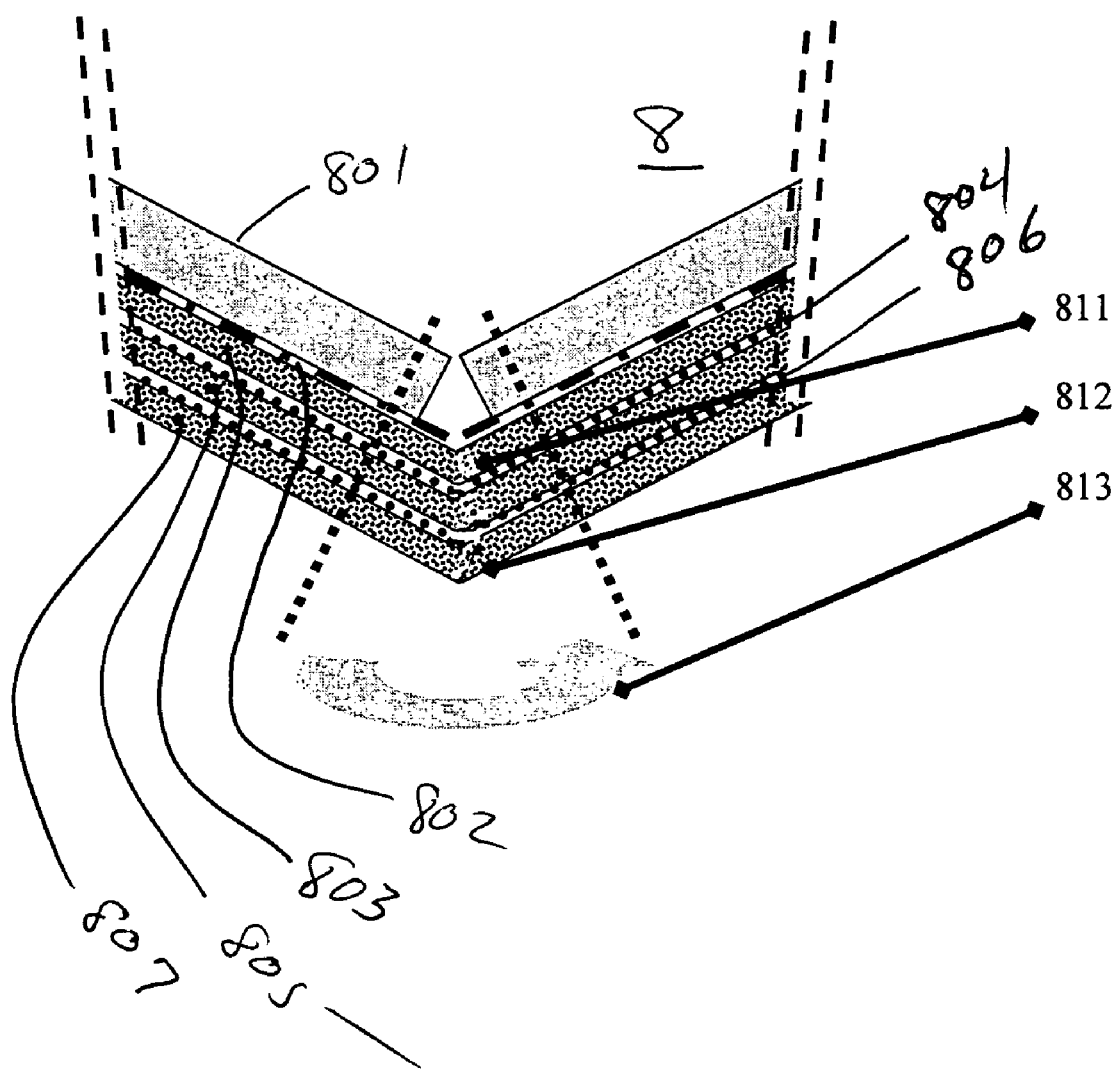
FIG. 8 is a diagrammatic cross section of an embodiment similar to that of FIG. 1, illustrating the controlled reaction of the structure within the zone of impact.

As can be seen with protective structures 1 and 8 in FIGS. 1 and 8, the gap width and the solids layer thickness are geometrically connected with respect to the bending flexibility of a solid/fiber composite structure of this design. FIG. 1 illustrates a preferred embodiment protective structure 1, with a solids layer 101 of thickness T and configured with a critical gap of width G. Solids layer 101 is continuously bonded, except for gap area, by bonding layer 102 to first fabric layer 103. Fabric layer 103 is hence continuously bonded by bonding layer 104 to fabric layer 105 and hence by bonding layer 106 to fabric layer 107. FIG. 8 is similarly constructed, with analogous solids layer 801 bonded by bonding layer 802 to first fabric layer 803 and so on. Structure 8 of FIG. 8 illustrates the flexing action at a gap of a structure like that of FIG. 1. Upon flexure of structure 8, a compression zone 811 and a tension zone 812 are generated in the fabric of the solid/fabric composite. This reaction in a fabric structure of finite thickness, where the solid layer thickness permits, results in a localization zone 813 over which a penetration force, to the extent not otherwise absorbed, acts on the structure. In a preferred embodiment, in order to achieve good bending flexibility, the gap width G is at least nominally 100% of the solids layer thickness T. Put another way, the thickness to gap width ratio T/G of a preferred embodiment for good flexibility is at most about 1 to 1; thereafter the thickness noticeably interferes with flexibility. T/G ratios of less than 1 to 1, where other criteria are met, provide greater flexibility of the protective structure.

This composite structure and critical gap geometry creates a relationship between gap G, bending flex, and critical penetrator width. In this invention it has been discovered that solid/fiber composites can be designed which meet or exceed the industry standards of penetration resistance criteria.

A preferred embodiment meeting NIJ 015 standard for penetration resistance criteria in classes 1-3 for both spike and knife at energy levels of 25-45 joules has the following specifications: an AS SS steel thickness of 0.010" thick hemmed solid layer plate with a 0.02" hem flange height; a critical gap of 0.01-0.015 inches; a 0.010" thick insert of carbon steel at 54Rc; the solid plate being a triangular 1.0 inch on a side with surface area of about 0.5 sq. inches; the flexible fabric bonded backing is a meta aramid fabric of 840 denier Twaron fiber of 16×16 epi construction, of which three bonded backer fabric layers are used; the bonding is done with DuPont AC type Neoprene cement with polymeric isocyanate primer; the fiber backer layers are arranged at 45 degrees of threadline rotation, keeping the angel of the theadline within 15 degrees of the solids gap segments directions; the bonded cover fabric is 70d DuPont Lycra with a 140 denier nylon knit of 3 oz/yd² bonded with a Huntsman thermoplastic urethane film CA116; unbonded backer layers are meta arimid fiber from Warren spun to 70/2 yarn in a 73×70 epi construction, and 10 unbonded backer layers are used.

Figure 15A:
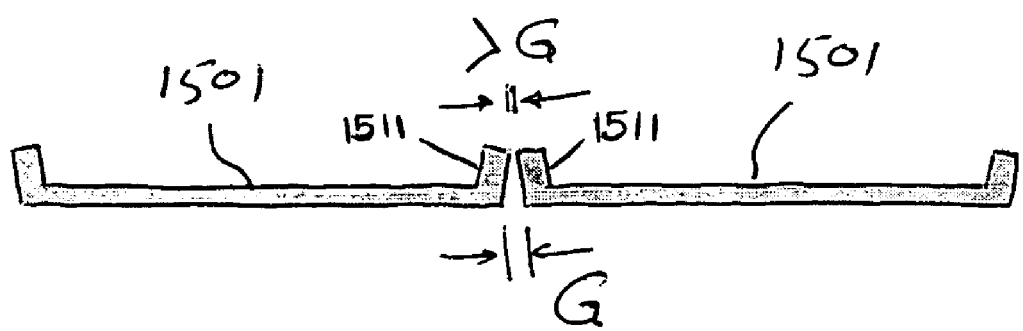
FIGS. 15A and 15B are cross section illustrations of a pair of hemmed edge solids layer parts forming a critical gap which is perfected by a slight curvature of the supporting body.
Figure 15B:
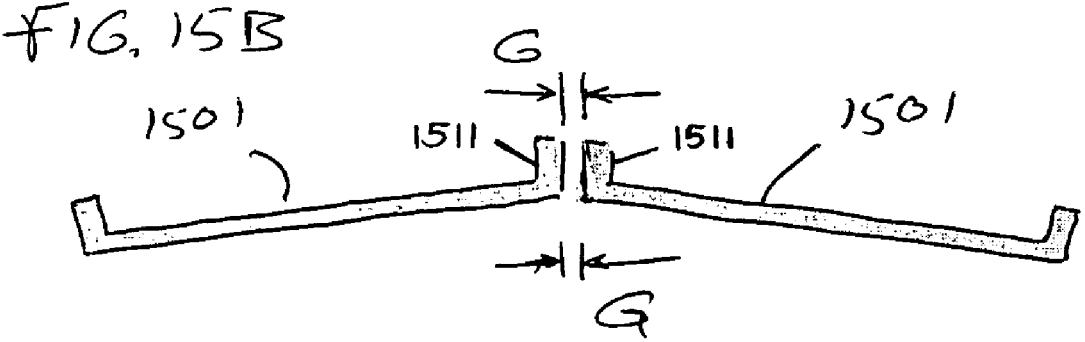

Critical Gap for Hemmed Parts:

Referring now to FIGS. 15A and 15B, there is illustrated in cross section a pair of hemmed edge solids layer parts 1501 forming a critical gap which is perfected by a slight curvature of the supporting body. As the adjacent hemmed parts 1501 are rotated about the gap fold line of the bonded backer layer (not shown here), the solids critical gap geometry changes. In the flat condition of FIG. 15A, the gap from the top will have a smaller than gap width G dimension because of the less than right angle orientation of hemmed flange 1511 to the base plane of the solid part 1501. In the case of this preferred embodiment the critical gap is uniformly of gap width G when the assembly is draped over an eight inch diameter cylinder, as in the orientation shown in FIG. 15B. This better defines that actual critical gap of this solid in service, in particular when incorporated into a protective garment worn on a users body.

Fiber Layer Selection

There are some variations to the force levels, directions, and related parameters for each of the penetrator types within the class of anticipated penetrator threats. The solid/fiber composite is useful for protection for each of these threat types, however there are variations among the preferred embodiments to optimize the performance potential of the solid/fiber composite to a selected particular threat.

The common framework for the specification of the critical gap covers all the penetrator types. The gap resistance to fracture and deflection must be proportional to the force of impact. The threshold values and units for each of the threat types follows. For edge and round spike weapons, 65 joules of impact relates to about 1000 Newton's of peek force. For ballistic threats, 700 joules delivers about 10,000 Newtons of peak force. And for UHPW jets, the protective structure will experience about 250 Newtons of force continuous.

Peak Force on Total Composite

The peak forces can be estimated where they can not easily be measured directly. To estimate the peak force at impact, a penetrator is mounted on a compression testing machine. A panel of protective structure material is mounted on a resilient backing and the penetrator is moved into the panel at a crosshead speed of 1 inch/minute. When the failure mode at impact is reached, the force curve is taken from the test equipment. The peak force from the quasi-static test can be used to estimate the peak force at impact.

It is important to avoid using test support material or tissue simulatants for which the effects would be significantly different than that anticipated in actual use, when a test penetrator force is applied at low rates. Some test supports such as Roma Plastalina have very rate dependent viscosities and can produce misleading data. However, so long as the deflection in the quasi-static case and the actual impact case are similar this test provides a good estimate of the peak force applied to the protective structure.

The range of forces among the penetrators is quite high, however the area of impact is also very different. The force per unit area is an important concept for evaluating the relative protective content required. For example, edge and round spike penetrators acting over about three square millimeters ($mm^2$) gives 300 $N/mm^2$. Ballistic penetrators acting over 63 square millimeters yields about 160 $N/mm^2$. And a UHPW jet acting over an 0.8 $mm^2$ area yields about 300 $N/mm^2$ energy per unit area of penetrator contact area cross section.

Given that there is a relatively narrow distribution of the force per unit area in all the threat types, it is easier to appreciate the common requirements and performance potential in the design of the critical gap protective structure. This consistency of force per unit area among the several penetrator types is the basis for the performance offered by the disclosed critical gap technology, which is the unifying aspect of the invention's several embodiments.

Peak Force Per Unit Gap Length

Figure 13:
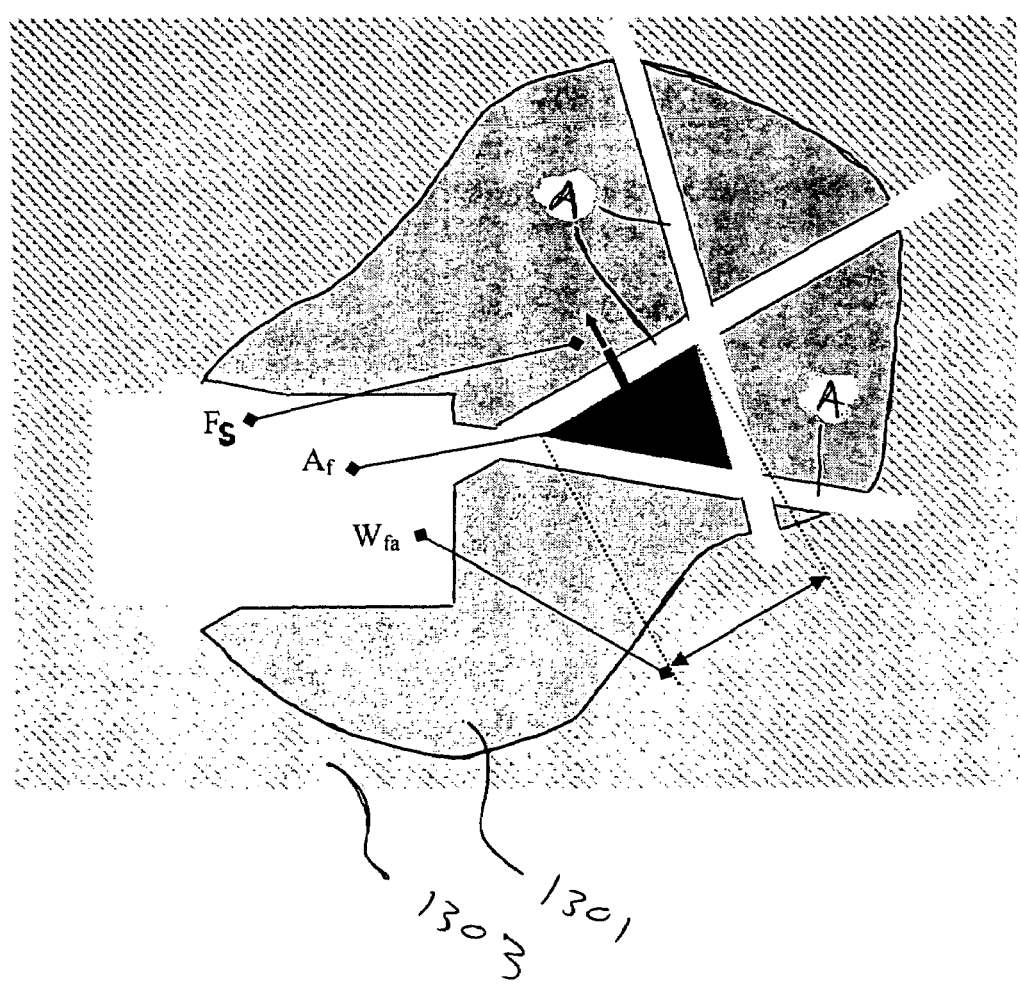
FIG. 13 is a diagrammatic planar view of a small area of an embodiment, illustrating the shear force, solid area affected, and width of underlying threadlines directly affected by an impact.

The commonality of unit force per area is not matched by the projected force per unit length of solid component or gap edge length. In the first group of penetrators, edge and round spike penetrators, the solid layer component is assumed to be as is shown in FIG. 13, where solids layer 1301, having gaps A, is bonded by bonding layer 1302 (not shown) to fabric layer 1303. To have a solid component projected width $W_{fa}$, or in other words the length along the edge of a gap, sufficient to support the anticipated force $F_t$ applied laterally by a penetrator trying to open the gap in the solids layer, and to distribute the force through the bonding mechanism or layer of area $A_f$ of the solids component adjacent the point of impact, uniformly over length W of the component width to the fiber layer or bonded fiber layers below.

With this assumption, the range in fiber layer tensile strength required to absorb the force is approximately a factor of 40. Threats force over the solid edge length as seen from the table can range from 400 KG/mm down to 10 K/mm. In the case where the solid layer or component is not stiff enough for mass reasons to support this force the difference is approximately a factor of 100. When the solid is damaged or deformed from the impact of the penetrator the loading can not be assumed to be uniform over the edge of the solid plate impacted. This effect is most common in ballistics. The deformation creates a stress concentration in the bonded backing layer fiber. To support this local loading the fiber content is increased in systems that are intended to offer protection from these penetrators. For this reason the preferred embodiments vary most in the fiber layers. Refer to Tables 1-5.

TABLE #5

Knife, Ballistic, UHP comparative parameters

| Example | Threat | Deformation | Peak tensile force KG | Loading width mm | Solid dimension mm | Load to width ratio KG/mm |
|---|---|---|---|---|---|---|
| 1 | Knife | No | 1000 | 2 | 25 | 40 |
| 2 | Ballistic | No | 10000 | 9 | 25 | 400 |
| 3 | UHP | No | 250 | 1 | 25 | 10 |
| 4 | Knife | No | 1000 | 2 | 25 | 40 |
| 5 | Ballistic | Yes | 10000 | 9 | 9 | 1111.111 |
| 6 | UHP | No | 250 | 1 | 25 | 10 |

Critical Gap Control

In the systems of the invention the performance of the material as a protective structure is related to the interaction between the solid component and the fiber component of the structure. However the flexibility of any two-ply composite of solid and fiber is limited by the dimensions of the solid layer elements and the geometry of the gaps in the solid. It is the dimension and spacing of the gaps that sets the level of flexibility of the protective structure and related comfort level of a solid-fiber composite according to the invention. A solid-fiber composite constructed without a gap incorporated into the hinge line pattern is necessarily constrained to flex or bend in one direction only from the flat state whereby the abutting edges in the solids layer open with flexure. This limitation assumes the fiber layer is relatively inelastic so as to inhibit folds in the other direction, as will be readily understood from the figures. However, as the gap is introduced into the structural design and the gap width approaches the thickness of the solid layer, the flexibility is no longer highly constrained in either direction off the primary plane of the composite structure. It should be noted that the use of an elastic cover layer does not materially change this behavior.

Figure 5:
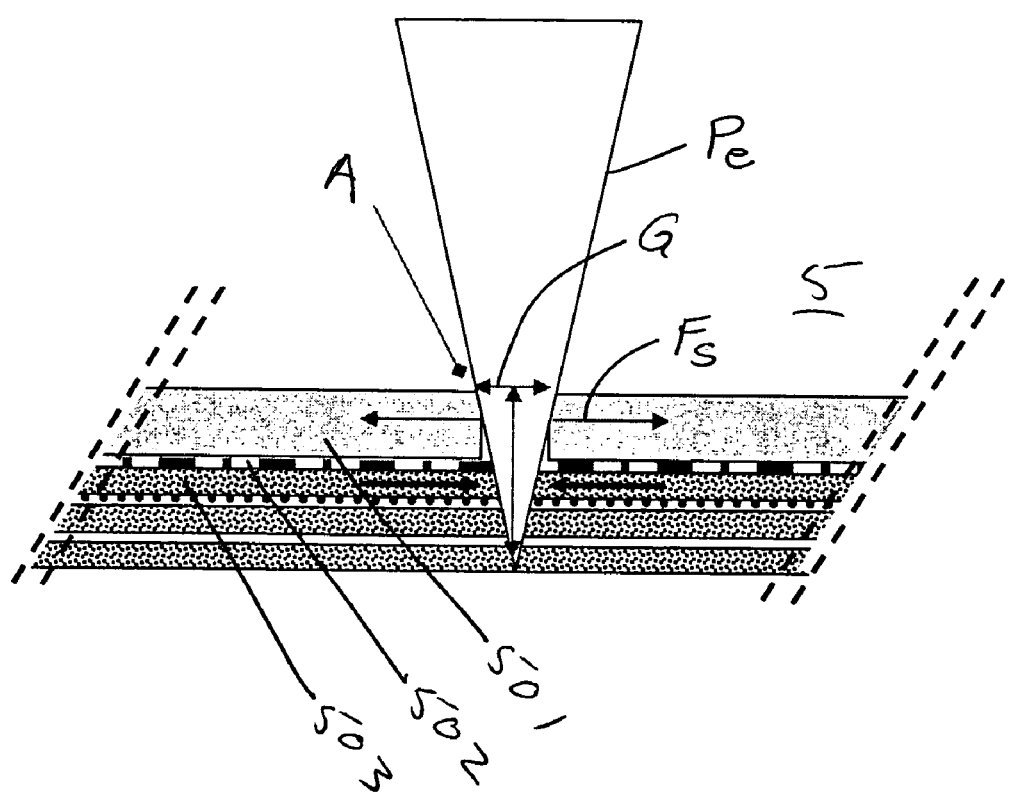
FIG. 5 is a diagrammatic cross section of an embodiment similar to that of FIG. 1, with a penetrator shown driven into the gap.

Referring to FIG. 5, with the basic solid/fabric and gap geometry explained, the issue that comes to the fore in the actual use of a gapped composite structure of the invention is the control of the solid layer 501 to fiber layer 503 via the fiber bonding mechanism or bonding layer 502 that transmits and distributes the effect of the gap geometry in the protective structure to the underside adjacent fiber layer or bonded fiber layers. The penetration of an edged weapon threat $P_e$ is shown in a solid-fiber composite embodiment 5 of the invention, creating a shear force Fe acting through solid layer 501 on the bonding layer 502 and placing fabric layer 503 in tension to resist the gap enlargement. Under the load from penetrator $P_e$, the gap dimension G becomes critical. If the elements of solid layer 501 are allowed to be laterally displaced by lateral force $F_s$ so as to permit the gap G to grow, the performance benefit from the solids materials properties is lost. It can be readily appreciated that the integrity of the system is dependent on the integrity of the bonding layer adhering the solid layer to the fabric layer. The area of effective bonding should extend to the greatest area possible along the edge length and within proximity to any gap. Preferably the solids layer is continuously bonded to the fabric layer over its entire underside surface area and, where used, the entire upper surface bonded to the elastic cover layer.

Still referring to FIG. 5, the thinner the bonding layer 502, the more effectively the shear force $F_e$ is transmitted to the fabric layer 503. While the bonding layer 502 is described as a layer, it will be further appreciated that deep penetration of the bonding agent into the fiber layer so as to encapsulate and grip individual fibers to the greatest extent possible is preferred, along with intimate placement of the fabric layer to the solid layer. This may result in bonding layer 502 having substantially no thickness.

The gap G in the un-deflected condition should be as large as possible within the design criteria for penetrator size and depth of penetration, approaching twice the thickness of the solids layer for optimal flexibility. Thereafter, however, the allowable lateral deflection must be kept very small to gain the benefit of the solids materials properties in resisting the penetration. If for example the solids layer is 0.020" thick, the gap width should approach 0.040". Conversely, this geometry of 0.02-0.04", or gap height to width ratio of about 1 to 2, can be said to set or define the minimum penetrator size that is practical to resist with this structure.

Referring again to FIG. 12, the width of the penetrator at its critical width is a defining parameter for a threat penetrator. Assuming that the solids layer 1201 component material performance at the gap edge or shoulder is adequate to resist or limit penetration, the loaded critical gap A and critical penetrator width limits the depth or length $L_p$ of penetration to the design limit penetration depth through the protective structure 12 and into the underlying backing.

In all the threat types illustrated the solid layer provides the point of contact that absorbs the concentrated energy of the penetrator and distributes it laterally and vertically over a larger surface area of the underside fiber component. The design and integrity of the gap is the key to the performance potential of the total structure. The penetrator will cut, or cause failure of the fiber in tension, if it does not fully engage the solid component sooner. In all embodiments of the invention, the composite structure of the invention must maintain this critical gap integrity and force engagement of the penetrator with the solid component, such that energy is transferred through this point of contact and through the bonding layer to place the fabric component in tension, or catastrophic failure of the composite material structure may occur.

Additional Affects for Gap Control

There are some additional factors that govern the critical gap control mechanism. Even in the case where both the penetrator and the solids component are of very hard, non-deformable materials, there may be some degree of deflection and/or fracture in the solids component if the energy of penetration is high enough. These additional effects include: critical gap deflection under penetration load; deflection and fracture of solid layer; deflection and fracture of the penetrator; bending deformation of the fiber backing; de-lamination of or at the Solid-Fiber interface, noteworthy in particular for UHPW jet type penetrators; and tensile failure of the fiber backing or layer under ballistic load.

Figure 10:
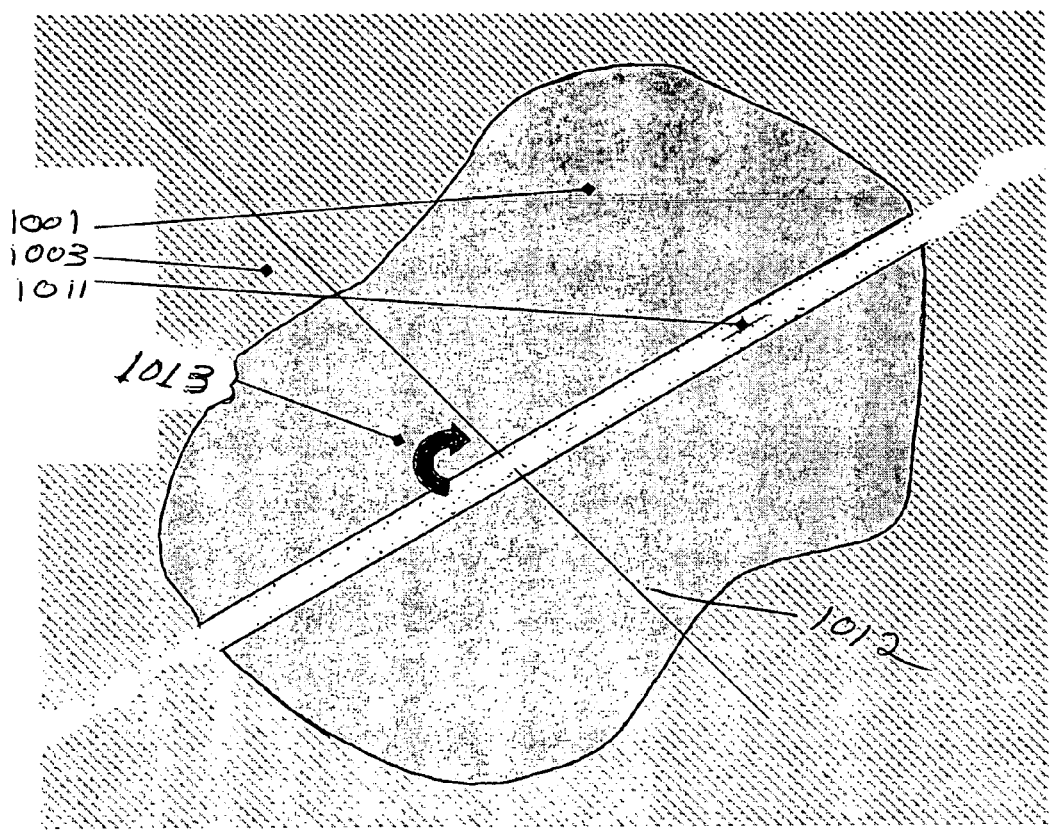
FIG. 10 is a diagrammatic planar view of a small area of an embodiment illustrating the angle between a gap line and the relevant threadlines of the underlying flex fabric layer.

The Deflection of the Gap Under Penetration Load;

Knife Round Penetrator Case:

Referring to FIG. 10, in accordance with the invention, assuming a suitable bonding mechanism is available, the deflection of elements of solids layer 1001 adjacent a point of impact on a critical gap is controlled by the selection and design of the fiber component or fiber layer 1003. In preferred embodiments this layer is a woven layer or fiber sheet with at least one axis or direction of fiber thread lines 1012 being oriented preferably nearly perpendicular, certainly having an intersecting angle within about plus or minus 30 degrees of perpendicular to each gap axis 1011 or direction in solids layer 1001. In this preferred embodiment the smaller angle 1013 of the two angles between the thread line axis 1012 and the gap axis 1011 should be at least 60 degrees and preferably closer to 90 degrees. In this way the fiber line is loading in tension closer to or nearly on its axis when a penetrator exerts force near a fold line or critical gap on the edge of a segment of the solid layer 1001.

In addition to having the preferred threadline or fiber axis alignment to the gap, the fiber layers preferably consist of or include a substantial amount of low elongation, high strength fibers of less than 5% elongation to break, and greater than 10 grams per denier tenacity, in at least the relevant direction with respect to a gap line in the solid layer. The fiber content of the thread lines should provide adequate stiffness and tensile properties for the forces that are anticipated to be imposed through the critical gap configuration by the impact threat. There are many threat criteria and test methods used to set criteria for protective materials. In this preferred embodiment the tensile strength of the fiber layers are preferably four times greater than the expected tensile load imposed by the penetrator impact. This 4× factor provides a margin of safety factor and reduces the effective elongation of the fabric component under impact to less than 2% (based on typical 5% elongation to break specifications) for the preferred embodiment. This higher tensile strength generally impacts flexibility of a fiber to some extent, but in most instances, the bending stiffness of the composite material need not be compromised further for the purpose of improving the safety factor.

Referring again to FIG. 13, the preferred embodiment of the fiber layers for resistance to knife or edge penetrator impact requires some definitions. The force exerted by a penetrator can be approximated as acting on a single point of the solid component. If the impact is on or very close to a critical gap A, the solid component or layer 1301 divides this force at the critical gap and distributes it into the underlying fiber layer 1303 over the solid-to-fiber bond layer or attachment area (shown in other figures). At least one set of fiber thread lines, being most nearly perpendicular to the gap, are loaded in tension along the projected length $W_{fa}$ of the impacted solid components in the impact load direction, by operation of the critical gap design.

Peak Force in the Fiber Layer

Referring again to FIG. 13, the peak force and the preferred tensile strength of the fibers of fiber layer 1303 can be defined. The peak force is estimated to be the peak force found (or anticipated by design to occur) at the impact event or point on a gap A. This peak force is then tested over the affected width $W_{fa}$ of the relevant fiber sheet within fiber layer 1303 intimately associated with the impact point through the solids-fiber interface. The breaking strength of the affected width $W_{fa}$ across the affected sheet of threadlines of the fiber layer component should be 1.5 to 4 times the peak force in preferred embodiments.

Fiber Layer Selection for Bending

In preferred embodiments the web form of the selected fiber layers forming the fiber layer component of the composite structure should preserve the low elongation and high strength characteristic consistent with the critical gap technology. Wovens and warp sheets both can have low crimp and meet these criteria. Fiber types such as Carbon, Para Aramids, LCP polyesters, UHMW polyethylene and other aromatic fiber types such as M5 are all suitable. The preferred materials in each of the fiber layer zones are not generally the same. The primary force exerted by a small penetrator on the composite structure of the invention is applied through the solids component to the flex fiber component in the fiber line direction. Bending or flexing deflection of the fiber component is a secondary consideration. The preferred embodiment requires that stiffness tenacity, impact toughness, cyclic bending, bonding and thickness all be considered for fiber selection. In the preferred embodiments Para Aramids and LCP polyesters are preferred as having the best overall properties for the bonded fiber backer layers. The UHMWPE and staple Para Aramids are preferred for underlying unbonded backer layers. The Lycra type elastic cover layers of tricot knit are preferred embodiment as a bonded cover layer above the solids layer for flex and bending.

Deformation and Fracture of the Solid Layer;

Knife Case:

The solid component layer is subjected to very high contact forces under the impact of a penetrator. In the case of a knife or edge type penetrator, the sharp edge exerts force over a very small area. In the preferred embodiment the solid layer component material is much harder than the penetrator material. In addition to being much harder the solid layer will have a much higher toughness than the penetrator. In the preferred embodiment the steel of the solid layer is more than 5 units Rc harder than the knife edge. This deferential hardness will create damage to the knife rather than the solid layer. However in this preferred embodiment the steel or other solid layer can be damaged in either ductile or a brittle mode. If the brittle mode is dominate, cracks can run from the impact point to create a premature failure at low energy to impact.

The benefit of the multi layer solids in the unhemmed and the hemmed embodiments is the ability to select a harder more brittle insert that is backed with a more ductile second layer. Given that some bullets and knives are produced of high hardness steels this multi layer system offers the option to use steel that is hard enough to damage the penetrator geometry even though the brittleness limit has been exceeded. For protection from penetrator impact, the more energy required to deform or fracture the solid component, the better.

For knife attacks, the Austenitic stainless steels at full hardness have been found to give good results as a solid component protective material. The energy to break characteristic of these steels is excellent and the high hardness limits the deformation at the edge of the solid layer adjacent the gap. In the preferred embodiment for knife protection the use of 0.015 inch thick full hard 301 Rc 48 to 59 Hardness stainless has been found to limit the fracture and deflection of the solid layer under knife attacks. The solid layer does receive some damage however the fracture and deflection is small and does not open the loaded gap width G to a great extent. For harder knife threats the addition of a martisitic 420 steel at Rc 52-57 insert or second layer is a preferred embodiment. In testing with preferred embodiments, the testing being done to the NIJ 00015 standard even the finer of the test blades does not penetrate beyond the allowable limit, even with impacts of 65 joules.

Ballistics Case:

The ballistics impact threat has some additional aspects for solids and fiber layer selection. Unlike the knife case a ballistic penetrator loads the solid layer at the gap in bending as well as in plane compression. It is not generally possible to select a solid layer material that has enough bending stiffness to resist deformation under the ballistic impact loads. This issue is addressed with the fiber layer, as described elsewhere in this material. The energy of the ballistic case is much higher and the preferred embodiment for handgun protection uses selections that are common to the knife case but additional one quarter to one half pounds per square foot of unbonded backer fabric layers of the ballistic type, refer to table #1, is used in combination.

For rifle protection, Mars Armor grade steel of 3 mm thickness is used for ballistic rounds including the 7.62 mm ball (AK47) and 5 mm Mars for 7.62 mm AP rounds.

Deflection and Damage to the Penetrator,

Knife Case:

When a knife impacts on the preferred solids layer the tip is destroyed and the capacity of the knife to cut, is greatly reduced. In this case the solid layer is lightly marked and no penetration is found through the solids layer. The worst case scenario is, of course, a knife tip impact directly on a gap. In this case the tip is not damaged by the solid layer and only the edges of the knife are in contact with the solid. When the solid layer consists of material of higher hardness and toughness, significant damage is found on all the surfaces and edges of the knife. The result is that large amounts of energy from the impact are absorbed as damage to the blade and little change is seen in penetration depth.

Ballistic Case:

As in the case of the ballistic threat, a key benefit of a solid/fiber composite structure is its ability to damage the penetrator. The design of the solids layer is intended to engage the bullet, deforming, enlarging and abrading its surface. Because of the high energies and harder bullet materials in use, fiber layers alone in a protective system can be overwhelmed. Some contemporary, less deformable bullet types can cause the fiber to fail completely without any deformation.

When the bullet is deformed at the strike face of the composite material panel, the underlying fiber layers can be much more effective. In the preferred embodiment the solid component layer is both hard and tough enough to deform the bullet before full penetration. When this balance is achieved the solid layer acts to spread the impact energy to a larger area in fiber layer. Depending on cost considerations steels, Titanium and ceramics are preferred. See tables 1-4 for preferred material types.

Bending Deformation of the Fiber Backing:

In the preferred embodiments the fiber component layers should have low bending stiffness. The more drape and softness in bending the better. As described elsewhere within, the invention requires a substantial bonding interface between the solid and fiber layers and the most effective bonding materials and methods tend to stiffen the fiber layers. However the use of thin layers of relatively light denier fabrics for the fabric layer component of the composite structure has been shown to provide good results. Fibers of less than 400 denier are preferred in the fiber layers for control of thickness. Thickness of the full compliment of bonded together fiber layers relative to the solid layer should be small as possible. However this objective is limited by the mechanical requirements of the fiber layers. The fiber layers must have adequate stiffness and tensile strength to resist the forces of penetration.

Referring again to FIG. 8, the critical gap zone of a preferred embodiment composite structure 8 is shown in cross section, deformed under bending of the composite material to an angle depicted by the dotted lines, thus showing the flex required in the bonded set of fiber layers 803, 805, and 807 to accommodate the bending. This set of three fabric layers is bonded together as a cohesive fabric layer component of composite structure 8 by bonding layers 804 and 806, and hence to the solids layer 801 by bonding layer 802. The solid-fiber composite structure with its critical gap operation forces all the bending in the fiber layers into the narrow flex localization zone 813 immediately proximate the gap. As can be seen in FIG. 8, the thickness of the fiber layer component will strongly affect the bending stiffness of the composite. More over, in the preferred embodiments the fiber is low elongation and this further restricts the flexing action as fiber stretch is not a significant part of the flexing mechanism.

It can be shown that flex is mostly accomplished by compression occurring in compression zone 811 in the fiber layers nearest to the solids layer, rather than in stretch occurring in the tension zone 812 in further underlying layers. In general, high strength fibers have poor compression performance in cycling. For this reason flex resistance in these further underlying layers 805 and 807 is relatively preferred over having it in first fabric layer 803. Carbon and Para-arimids are quite poor in compression results. However LCP polyesters such as Vectran or UHMW polyethylenes like Spectra or Dyneema have acceptable properties in compression. In the preferred embodiments, the fiber layers closest to the solids layer are of LCP polyester and the layers farthest from the solids layer may be of either LCP polyester of Para Arimid.

Figure 9:
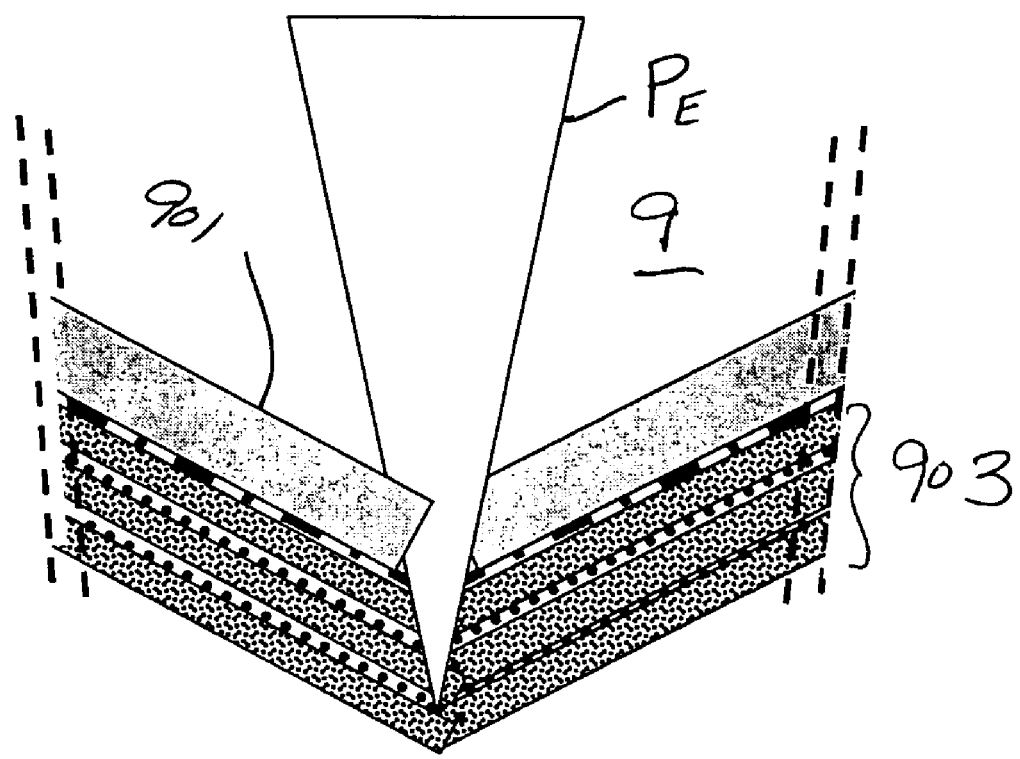
FIG. 9 is a diagrammatic cross section of an embodiment of the invention, illustrating penetration and flexing of the structure under impact.

Referring again to FIG. 8, when the composite structure is flexed or bent outward around and relative to the gap reference, as when the gap is depressed inward by a penetrator strike, the solids layer gap tends to close. Referring now to FIG. 9, when a penetrator $P_e$ deflects the composite structure 9 inward at the gap as shown, this same relative bending motion introduces a closing force due to the bending of integrated, all bonded fabric layer 903, applied by the adjacent elements of solids layer 901 on the solid layer gap width. This raises yet higher the mechanical force required by the penetrator to achieve further penetration of the solid layer. This effect tends to improve the performance of a solid/fiber composite structure having a soft bending flex performance rather than too stiff a one. In addition, the deflection of the total structure absorbs and distributes energy as it deflects. Because the relationship of energy transfer at impact is 1. E=F·D,
2. where E is energy, F is force and D is distance.

From this relationship it will be readily apparent that the force is reduced for a given energy level if the distance for the absorption of the impact is made greater. So bending flex is an advantage for both reduction of gap size, and for reduction of peak force during absorption of the impact energy.

De-Lamination of the Solid-Fiber Interface:

All of the threat types of interest for solid/fiber composite structures of the invention have the potential for delaminating the solid layer from the fiber layer at impact. However if the bond layer performance is in the preferred range, the knife and ballistic penetrators tend not to trigger this failure mode. A jet of Ultra High Pressure Water (or other fluids), however, has some unique behavior characteristics as a penetration threat. In testing for resistance to UHPW, the EU (European Union) standards working group has selected particular pressures, flows, reaction forces and scan speeds as data points for testing. The details are reported to be available by about February, 2004, for enquiry and comment. In this test method, a flow of up to 8 lpm (liters per minute) of water at pressures of 3000 bar are scanned or swept at 0.5 m/sec over the panel.

Figure 4:
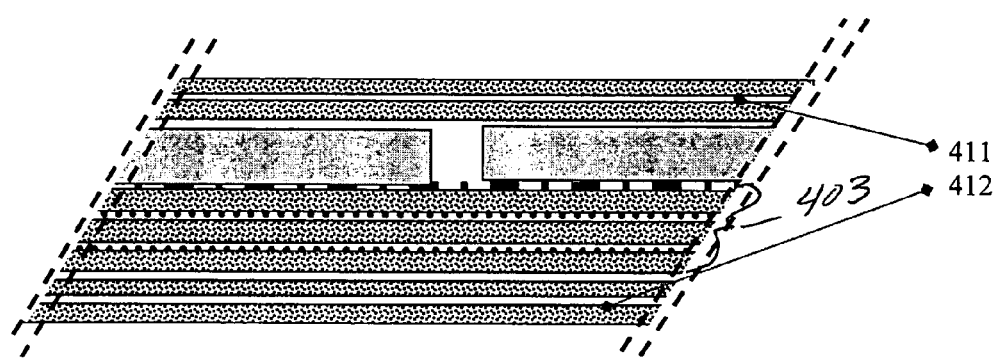
FIG. 4 is a diagrammatic cross section view of an embodiment similar to that of FIG. 1 but having additional front side fiber layers shielding the gap and additional backside fiber layers adding further tensile strength to the structure.
Figure 7:
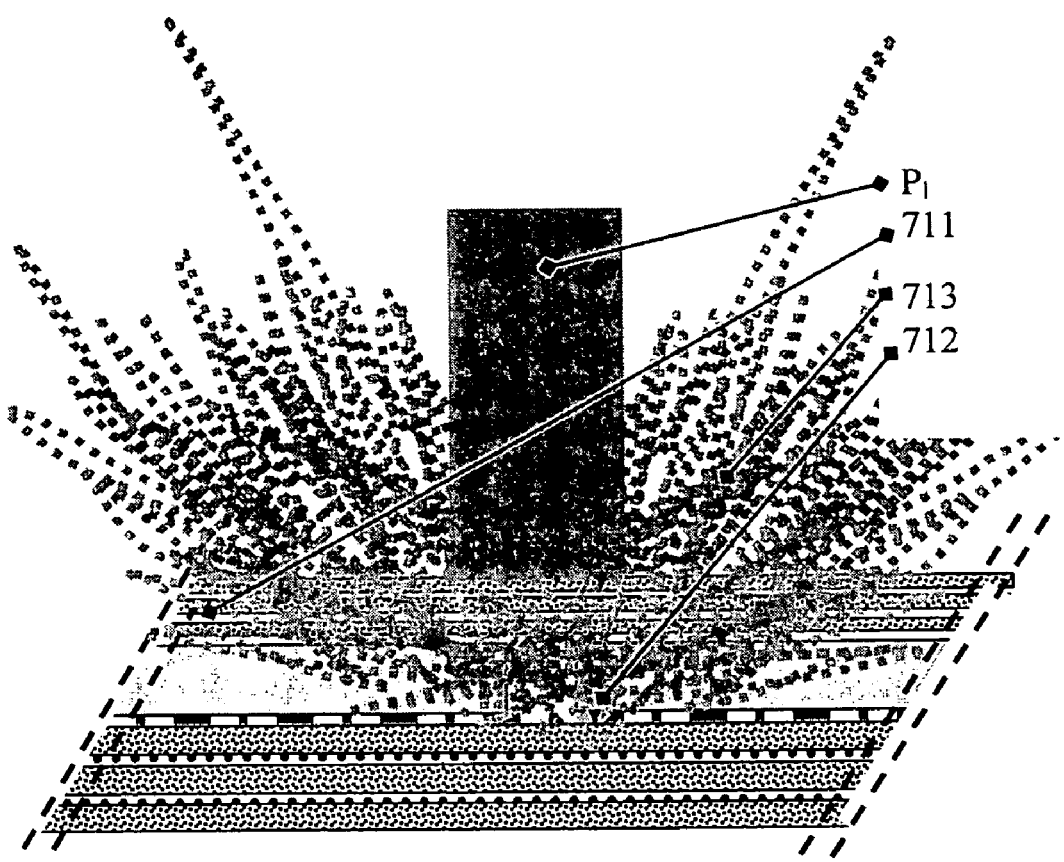
FIG. 7 is a diagrammatic cross section of a variation of the embodiment of FIG. 1, having a shielding component above the solids layer to aid in resisting penetration by impact of UHP Water.

Referring now to FIGS. 4 and 7, a defusing fluid impact penetrator $P_1$ produces components of force in the plane of the protective structure as well as perpendicular to the plane. Because UHPW has an ejected flow in the plane of the impact surface, there is a strong tendency for the ejected flow to under cut the solids layer at point 712 in the solids gap unless it is adequately protected. The ejected flow 713 has a lower velocity than the main stream penetrator $P_1$ but because there is a high overall flow rate there is still significant energy in this ejecta. An additional structural component is required in the composite structures 4 and 7 to inhibit this action in UHPW cases; a flexible, impact side, shielding component 411 and 711 respectively, in the form of a front face or strike face layer over the solids layer component to isolate the solids component gap from exposure to direct contact by the fluid stream $P_1$. In preferred embodiments, this component is also a fiber material. The selection of the strike face side fiber layers and the character of the gap materials is clearly important to optimize the protective potential of the UHPW case. In the preferred embodiments the strike face fibers are woven into a dense web with an aerial density of 10-25 oz/yd$^2$. Two to eight layers of this material comprise the UHPW preferred embodiment shielding components 411 and 711 respectively. The Fraser permeability of the strike face shielding component should be less than 10 CFM/yd2. The fiber should be between 6 and 8 gpd (grams per denier) and polyester, nylon and polypropylene fiber materials are preferred.

Because the penetrator is a fluid or liquid jet, normally water, the hardness index of the solids layer material is not as critical as in the case of solid penetrators, so long as there is not abrasive material in the stream. Aluminum of industry grade 6061 T6 of a thickness between 0.01 and 0.05 inches is preferred for the solid layer component in UHPW applications.

The solid component to flex fiber component bond layer edge at the gap is critical for resistance of the undercutting and delamination phenomenon in these applications, and urethane is a preferred bonding agent. Bonding of the solid material to the first fabric layer includes a solid-to-fiber bonding affecting a multiplicity of the fibers of the first fabric layer. Grades of Estane® brand urethane or equivalent with a melt point of between 325 and 400 degrees F. are preferred for their abrasion resistance.

For the UHPW case, the flex fiber component or backing fiber layers of the composite structure should be woven of 200-500 denier meta aramid or LCP polyester in the preferred case. The "cover" factor of these wovens should be high above 50%, the characteristic of cover with respect to fabric design being more fully explained and defined in Howland's U.S. Pat. No. 5,976,996, herewith incorporated by reference. Like the solid-to-fiber bonds of which the first bonding layer is comprised, the intra fabric layer fiber/fiber bond throughout the flex fiber component of the structure should be urethane in the same class. In all cases the bond line shear strength and peel strength at the gap edge should be as high as practical.

The FIG. 4 structure is distinguished from the FIG. 7 structure with the addition of not-bonded layers 412, further underlying the bonded layers 403. The use of such additional adjacent but unbonded layers underlying the bonded fabric layers as in FIG. 4 is also useful in ballistic cases, as has been described elsewhere within, for supplying additional tensile strength to the composite structure without adding undue stiffness or inflexibility to the bonded fabric layer.

Tensile Failure of Fiber Backing Under Impact Load;

Ballistic Case:

Under the high impact forces from ballistic impacts, the fiber layers have to be designed to prevent tensile failure. Referring again to FIG. 6, the design of the solids layer 601 of the composite structure 6 is intended to engage the bullet penetrator $P_b$, deforming, enlarging and abrading its surface. Because of the high energies and harder bullet materials in contemporary usage, the bonded fiber layers 603 and 605 in a protective system can be overwhelmed and the bullet cause the fiber to fail completely without any deformation of the bullet. However, when the bullet is deformed at the solid component strike face of the protective structure in accordance with the invention, the underlying fiber component is a much more effective contributor to the effectiveness of the system. Resistance to bending and fracture are key criteria for the solids layer materials selection. In preferred embodiments the solids layer 601 is both hard and tough enough to deform the bullet before full penetration. When this balance is achieved the solid layer 601 acts to spread the impact energy to a larger area in the fiber layer through the solid/fiber interface bond layer 602 in the manner previously described.

Figure 6:
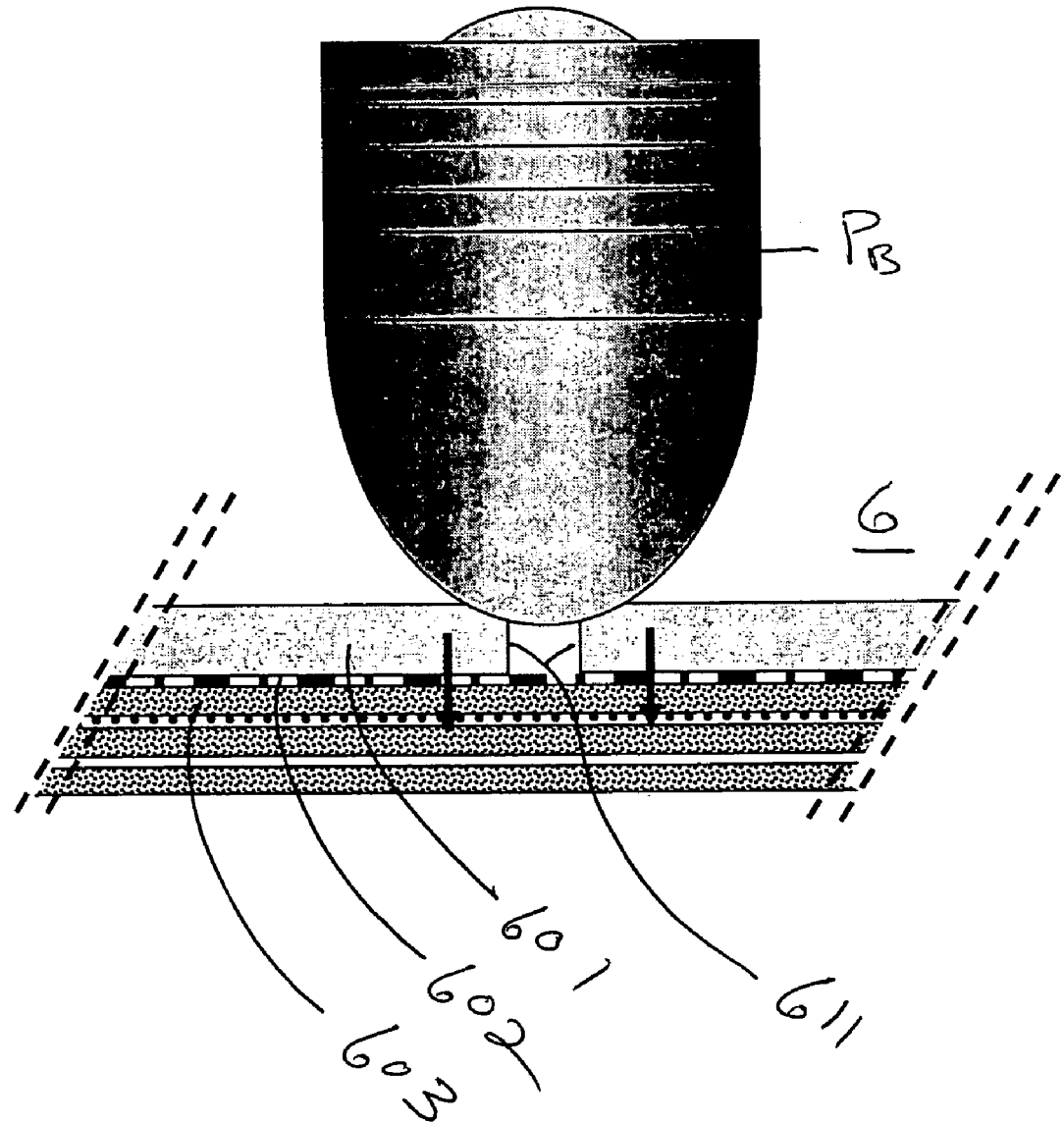
FIG. 6 is a diagrammatic cross section of an embodiment similar to that of FIG. 1 but configured for resistance to ballistic penetration.

As can be appreciated from the cross section view of FIG. 6, the edge 611 of the solid at the gap is a critical point in the ballistic-protective composite structure. The solid component has at this point an edge that is supported by the flexible fiber component; at least a fiber sheet or layer of thread lines oriented at a 60 to 90 degree angle to the gap axis. Referring also to FIG. 10, the bending forces from a ballistic impact at the gap are then translated into bending and flex occurring at the gap, and tensile forces in the fiber component layer. The sum of all these forces tends to compress the solid layer material into the fiber layers. The edge of the solid must be designed to avoid cutting the fiber layer 603 during this compressive action and energy transfer. In addition, the creation of sharp fracture edges in either the solid or the bullet should be avoided as these edges can likewise cause premature failure of the fiber tensile performance.

Because it is not possible to avoid some damage to the fiber layer from bullet and solid layer edges, the tensile strength of the fiber system must be designed with a safety factor. In the preferred ballistic embodiments the fiber tensile layer uniformly bonded to the solid layer has by design at least 1.5 times the required design strength to defend against a selected penetrator impacting the composite structure segment at the gap. Referring again to FIG. 13, there is illustrated the plan view relationship between the solids layer 1301 and the fabric layer 1303 by which a specific width of the fiber sheet or fabric layer associated with a segment of a particular gap A is available to absorb the anticipated tensile forces. It is this specific width $W_{fa}$ of fabric layer, which multiplied by the end count of the relevant yarn sheet that yields the number of contributing fibers, that must meet the 1.5 times tensile strength test. The relevant yarn sheet is, of course, one with threadlines running more or less perpendicular to the gap segment impacted.

In some cases and some embodiments, the unit mass or surface area limit for the ballistic resistant solid layer component does not allow for enough material in the solid layer to prevent some penetration locally under the bullet impact area. In this case the projected fiber width available for tensile energy absorption should be based not on the associated gap segment length so much as on the bullet or penetrator diameter, possibly requiring a different or higher average tensile strength fabric component to the composite structure. This is the conservative design case. Because of bending stiffness considerations and the large tensile requirement in the preferred embodiment more than half of the total fiber is contained in additional unbonded layers underlying the bonded layers.

A test method for measurement of force at penetration is required for fiber layer design. The peak force at penetration can not be measured directly in the ballistic case. So a secondary method is required. The values used in this disclosure are based on a special method. In this test a steel pin is used to simulate the bullet. The pin has a tip radius of 1" and has a diameter to match the ballistic diameters of interest. The test pin is forced into the panel system with a hydraulic ram and the peek pressure recorded at penetration. The force on the pin can be calculated from the ram area. This method is similar to the Mullins Burst test in measurement of pressure and force. The sample is held in a ring flange clamp of 6 inch diameter. In addition to the ring clamp, ½" hard rubber backing is used under the contact point. The rubber backing material is defined by the NIJ 00015 standard. The force required to deflect the rubber backing can be removed from the measured force by doing a test without a sample and measuring the backing-only force. This value is subtracted from the test force as in the tare value process with Mullens burst test.

Solid Materials;

Typical Solid Materials Arial Density and Geometry:

The current expectation in protective materials in garment applications is to have an aerial density of less than 1.0 lb/ft². In order to keep total mass in this range the thickness of the solid materials component of the composite structure must be kept under about 0.025 inches for solids with a specific gravity of 7 or higher. Because of this tight limit on the solids mass, the available mass must be distributed in an optimal fashion.

Figure 2:
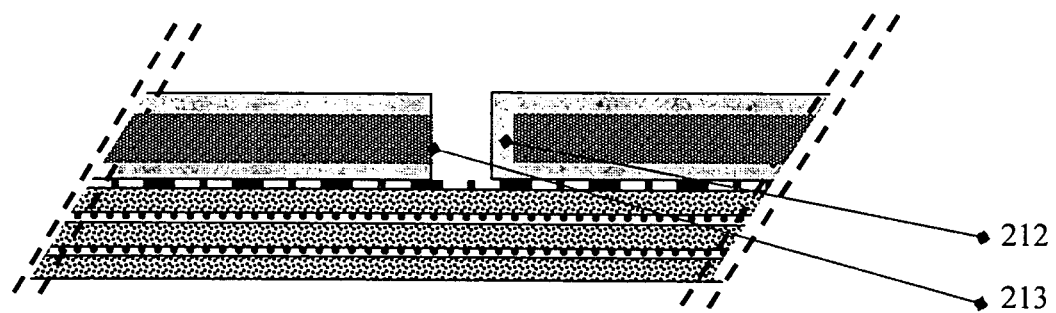
FIG. 2 is a diagrammatic cross section view of a structure of the invention, illustrating an untreated gap edge and a treated gap edge.
Figures 3A, 3B:
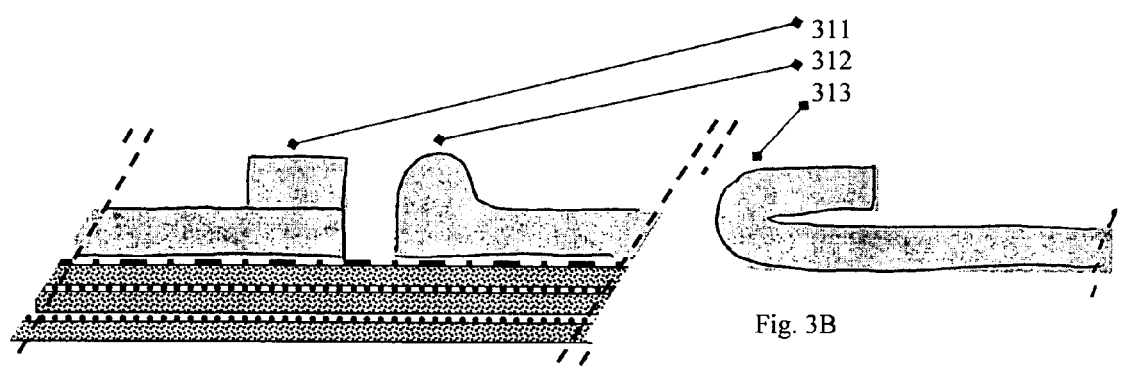
FIGS. 3A and 3B are diagrammatic cross section views of a structure of the invention illustrating different methods of reinforcing solid edge terminations.

Referring to FIGS. 2 and 3, there are illustrated examples of solids layer 301 with different reinforced edges, as illustrated by examples 212, 311, 312, and 313 respectively. Edge 213 in distinction is not reinforced. Different edge treatments alter the response to impact at the edge of the solid layer component or in the gap. The most vulnerable area of the solid is at the edge. When a penetrator impacts at the edge, the forces can reach the failure limit of the solid more easily than if the impact is away from the edge. For this reason the preferred embodiments provide edge hardening treatments as in edge 212, or distribute mass disproportionately to the edges of the solid layer and away from the center, as in edges 311, 312, and 313. Fabricated strips or other sections of material may be used as in edge 311, however this does not deliver the full benefit of the materials as there is incomplete bonding at this joint.

There are two preferred methods of solids edge treatment for edges forming gap segments in the solids layer. In the case where the solid may be molded as in the preferred ceramic materials and then heated to complete consolidation, or in forging in the case of metals, this edge should have the cross section shape of edge 312, with relaxed corners. Because many of the metals require both heat treating and work hardening to achieve their best properties the heat of forging does not allow for the highest hardness. In this case the austenitic stainless steels are preferred for toughness and hardness. However where the forging process is not optimal, cold working of the edge as in the example of edge 313 is preferred.

Examples of metals and ceramic composites used in the solids component of preferred embodiments:

1. Metals
   i. Martensite Steel
   ii. Austenitic Stainless Steel
   iii. Aluminum
   iv. Titanium
2. Ceramic Composites
   i. Silicon Carbide
   ii. Boron Carbide
   iii. Metal Ceramic
   iv. Special Shapes
   v. Beveled Edges with compression resistant layering
   vi. Core materials for improved solid stiffness Solid to Fiber Bonding Layers:

In order to maintain the geometry and assure the effectiveness of the critical gap in any and all embodiments of the invention, the elements of the solids layer must retain their relative position in the composite structure. The critical gap is only maintained if the solid layer is not negatively displaced under forces induced by either flexing in normal usage, which is avoided by design, or the impact of a threat penetrator, which is the performance challenge. The preferred embodiment requires that the attachment of the solid to the fiber layers have a maximum available shear strength in the bond.

The selection of an adhesive between the solid component and the first fiber layer must meet two criteria. First, the adhesive must have a lower surface energy with respect to the solid material, second it must meet the solubility parameter consideration described in the fiber to fiber section of this disclosure.

Among the factors that affect solid to fiber bonding are: fiber and solid surface preparation for removal of contaminates; selection of adhesive materials; and precise control in the bonding process.

All fiber materials are normally supplied with oil and other low energy surface lubricants and static controllers as a coating on the filament. These materials tend to interfere with the bonding of fibers with adhesives and resins. These materials must be scoured off and the remaining extractables should be less than 0.3% by acetone soxlet extraction methods. Solids component metals and ceramics have many of the same issues however they can normally be ashed off at 600 degrees F.

Shear Strength of the Solid/Fiber Bond and Area Per Unit Requirements:

There are a wide range of adhesives that might be employed for the bonding mechanism used for attaching the solids layer to the first or flex fabric layer component of the composite structure of the invention. It is the severity and type of service for which a particular embodiment is intended, that narrows the selection and process: maximum or most severe service requires thermoset RFL materials for the highest toughness and temperature; intermediate service requirements can utilize various elastomers. Neoprene and SBR/isoprene blends are effective; and for lighter service the use of thermoplastic materials is possible, with acrylics and urethanes being the preferred materials.

The result of this consideration of the severity and type of service, followed with adequate preparation, priming and adhesion in the fabrication process, is a bond of high shear strength that supports the critical gap functionality.

For example, a good minimum load bearing shear resistance bond for the adhesion of the solid to the fiber component is 500 lbs per square inch. The test method is lap shear where the solid is mounted in one jaw of a tester and the fiber layer is mounted in the other jaw. A cross head speed of 1 inch per minute is used and the force reported for separating the layers is the average of 5 samples using the peak value measured.

Figure 11:
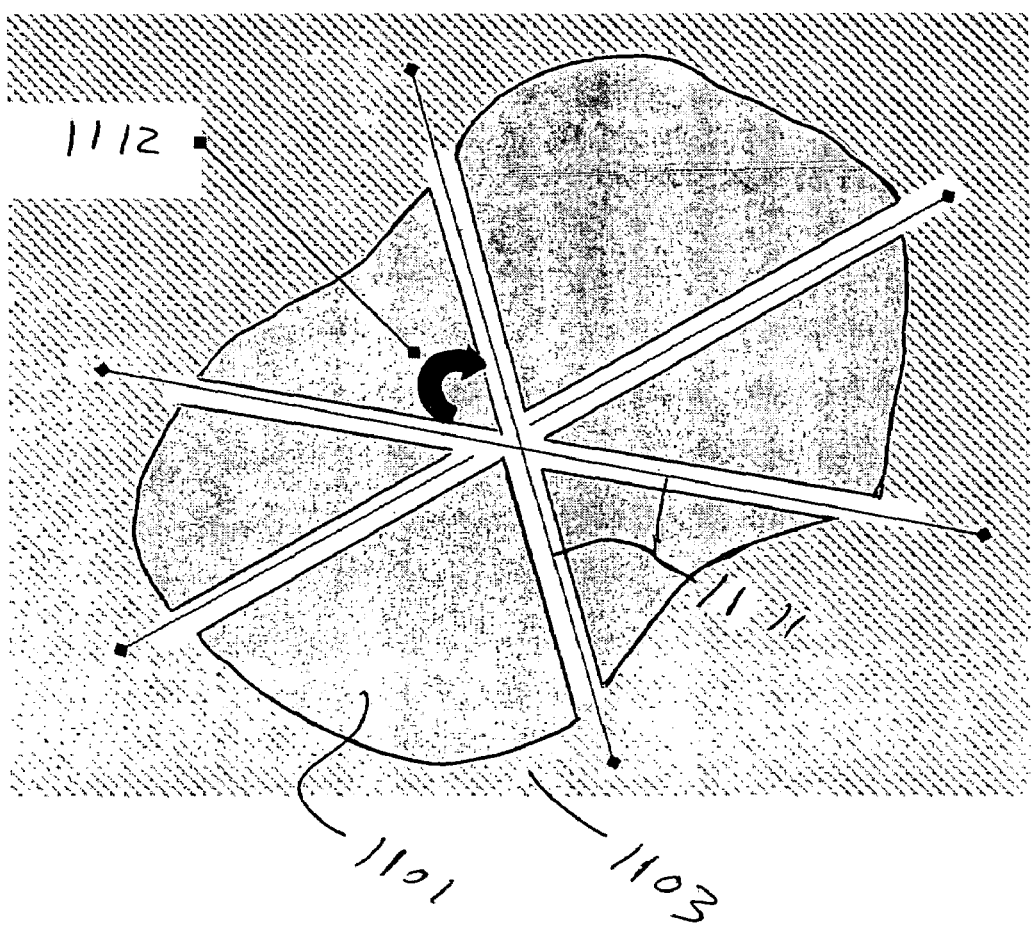
FIG. 11 is a diagrammatic planar view of a small area of an embodiment illustrating the intersecting angle of gap line segments within the solids layer.

Fiber to Fiber Bonding:

Like the critical solid to fiber bond, the adjacent fiber layers of the fabric layer may be equally well bonded to each other. Referring to FIG. 11, the included angle 1212 between intersecting gap lines 1211 of solid layer 1201 on fabric layer 1203 should not be less than about 60 degrees, to avoid creating weak corners in the solids layer. As likewise indicated in the description of FIG. 10, the various gap line segments in the solid layer 1201 must each be matched by a nearly perpendicular, co-planar fiber thread line in the fabric layer 1203.

However only one fiber layer can be directly in contact with the solid layer. The rest of the fiber layers must provide their respective stiffness through the further bond of the individual fiber layer to fiber layer attachments within this component of the composite structure. Like the primary solid component to first fiber layer bond, the fiber to fiber bonds are critical to maintaining control of the gap geometry for the gap segments perpendicular to and associated with each respective layer of fibers. The peel strength of the "T" type testing method should yield an average peel force per inch of width of not less than about 8 lbf (pound feet) as between bonded layers in preferred embodiments.

As in all fiber to fiber bonding a suitable adhesive must be selected, preferably from among the candidates that have been identified in the previous section of this disclosure. The same group of adhesives listed in solid/adhesive/fiber part of the composite structure are useful in the fiber/adhesive/fiber part of the composite structure. In order to achieve the required performance in this fiber/adhesive/fiber structure the materials must be carefully selected. The best criteria for adhesive selection is the solubility parameters, (S.P.) as is well described in the text: *Role of Adhesive-Substrate Compatibility in Adhesion*, Iyengar Y. and Erickson D. E., Journal of Applied Polymer Science, Vol. 11, PP. 2311-2324, (1967).

Using the solubility criteria per Iyengar, the S.P. delta or difference between the fiber and the adhesive must be no more than 1.5 Hilibrands for acceptable strength and endurance of the fiber/adhesive/fiber and the solid/adhesive/fiber portions of the composite assemblies.

Gap Line Patterns:

Custom repeating or varying patterns of gap lines in a solids layer may be computer generated for optimization according to the criteria of the invention. The pattern may be tailored for a user's protective garment to match the threat profile variation over the surface area of the user's body and the intended orientation of the composite structure within the protective garment. Patterns of all types may be generated by precision cutting or otherwise reducing sheet stock of the selected solids material with a kerf or parting line of the correct pattern and gap width, followed by application of the first or all bonded fabric layers thereto with the selected bonding mechanism so as to hold the solid layer pattern and critical gap intact.

The invention is susceptible of many embodiments. For example, there is a solid and fiber composite material for resisting penetration by a select penetrator, consisting of a solids layer bonded by a bonding layer to a flexible fiber layer, where the solids layer is configured with a critical gap with a gap width of at least 50% of the thickness of the solids layer. The composite material may have a surface area unit weight not more than 1.2 lb/ft2. The gap width may be no greater than the width of the select penetrator at its permitted depth of penetration into the composite material. The bonding layer may have at least 500 psi of shear strength. The flexible fiber layer may have a tensile strength greater than 10 GPD. The solids layer may have a hardness of at least 100% the hardness of the selected penetrator. The selected penetrator may be a knife edge or pointed penetrator or a UHPW jet.

There may also be a flexible shielding layer adjacent to the solids layer opposite the flexible fiber layer. The flexible shielding layer may have an aerial density of between 10 and 25 ounces per square yard, inclusive. The gap may be multiple intersecting gaps, where the intersections divide the gaps into gap segments. The gap segments may have intersecting angles of at least 60 degrees. Each gap segment may be oriented within at least 30 degrees of perpendicular to a common threadline direction in the fiber layer. A common threadline direction will be readily understood to mean the direction of a pattern of parallel laid fibers within a fabric or a yarn sheet, generally equally spaced apart.

Also, the fiber layer of the above example may be configured to have a tensile breaking strength in the direction of a common threadline over the length of a gap segment, of at least 100% of the anticipated force of the select penetrator. The penetrator may have an anticipated impact force of at least 60 lbf. The fiber layer may have a tensile breaking strength of at least 250 lbf. In other examples, the fiber layer may have a tensile strength of at least 6000 lbf.

This and other examples may have a flexible fabric underside layer adjacent to the flexible fiber layer opposite the solids layer. The flexible fabric underside layer may be configured of fibers with tensile strength greater than 10 GPD. And the solids layer may have a thickness of between 0.01 and 0.04 inches inclusive. Also, the bonding layer may be a bonding interface between the full underside surface area of the solids layer and the fibers of the mating surface area of the flexible fiber layer.

The deflection in the critical gap at the tensile breaking strength of the fiber layer may be less than 20%.

Another example of the invention is a solid and fiber composite material for resisting penetration by a select penetrator, consisting of a solids layer bonded by a bonding layer to a flexible fiber layer, where the solids layer is configured with a pattern of intersecting gap line segments, and the gap line segments have a uniform critical cross section gap geometry where the gap height is equal to the solids layer thickness and the gap width is at least 50% of gap height, and the bonding layer has at least 500 psi of shear strength. Elongation in the fiber layer at 100% of the anticipated penetrator force may be limited to not more than 2%. The fiber layer have a tensile strength of not less than 60 lbf.

The deflection in the gap at tensile breaking load may be limited to less than 20%. The flexible fiber layer may include fibers of less than 400 denier. And the bonding layer may include a bonding interface between the full underside surface area of the solids layer, which excludes the gap area, and the fibers of the mating surface area of the flexible fiber layer. The flexible fiber layer may include multiple fiber layers with at least one common threadline direction running within 30 degrees of perpendicular to each gap segment in the solids layer. The bonding layer may extend from the full underside surface area of the solids layer to the fibers of all the multiple fiber layers.

The material may further incorporate a flexible shielding layer adjacent to but not bonded to the solids layer, on the opposite side as the flexible fiber layer. And the material may include a flexible fabric underside layer adjacent to but not bonded to the flexible fiber layer on the opposite side as the solids layer.

Other examples include a solid and fiber composite material where the gap segments and intersections define discrete solids layer parts. The solids layer parts may have hemmed or otherwise treated or formed or built-up edges. The solids layer parts may have gap edge angles of less than 90 degrees upward from the plane of the solids layer part, so that a slight flexure of the material is required to make the gap edges uniformly parallel. The solids layer parts may be configured as a bonded laminate of at least a first and second layer of solid materials, where the first layer is more brittle and less ductile than the second layer.

Other and various aspects of the invention and equivalents of the embodiments illustrated, within the scope of the claims that follow, will be apparent to those skilled in the art from the specification and figures provided.

I claim:

1. A solid and fiber composite material for resisting penetration by a select penetrator, comprising a solids layer bonded by a bonding layer to a flexible fiber layer, said solids layer configured with multiple intersecting critical gap segments with a uniform gap width of 50% to 400% of the thickness of said solid layer, said gap segments having two to three common directions of gap segment alignment within said solids layer and intersect angles of at least 60 degrees, said flexible fiber layer having thread lines oriented within 30 degrees perpendicular to each said common direction of gap segment alignment, said intersecting critical gap segments defining solids layer elements, said bonding layer comprising a resin-based, inter-fiber continuous all area bonding interface between the full underside surface area of said solids layer elements and the fibers of the mating surface of said flexible fiber layer.

2. A solid and fiber composite material according to claim 1, said composite material having a surface area unit weight not more than 1.2 lb/ft2.

3. A solid and fiber composite material according to claim 1, said gap width being no greater than the width of said select penetrator at its permitted depth of penetration into said composite material.

4. A solid and fiber composite material according to claim 1, said bonding layer having at least 500 psi of shear strength.

5. A solid and fiber composite material according to claim 1, said flexible fiber layer having a tensile strength greater than 10 GPD.

6. A solid and fiber composite material according to claim 1, said solids layer having a hardness of at least 100% the hardness of said select penetrator.

7. A solid and fiber composite material according to claim 6, said select penetrator being a knife.

8. A solid and fiber composite material according to claim 1, said select penetrator being a water jet.

9. A solid and fiber composite material according to claim 8, further comprising a flexible shielding layer adjacent to said solids layer opposite said flexible fiber layer.

10. A solid and fiber composite material according to claim 9, said flexible shielding layer having an aerial density of between 10 and 25 ounces per square yard, inclusive.

11. A solid and fiber composite material according to claim 1, wherein said fiber layer has a tensile breaking strength in said threadlines of at least 100% of the anticipated force of said select penetrator.

12. A solid and fiber composite material according to claim 11, said penetrator having an anticipated impact force of at least 60 lbf.

13. A solid and fiber composite material according to claim 11, said fiber layer having a said tensile breaking strength of at least 250 lbf.

14. A solid and fiber composite material according to claim 11, said fiber layer having a said tensile strength of at least 6000 lbf.

15. A solid and fiber composite material according to claim 1, further comprising a flexible fabric underside layer adjacent to said flexible fiber layer opposite said solids layer.

16. A solid and fiber composite material according to claim 15, said flexible fabric underside layer comprising fibers with tensile strength greater than 10 GPD.

17. A solid and fiber composite material according to claim 1, said solids layer having a thickness of between 0.01 and 0.04 inches inclusive.

18. A solid and fiber composite material for resisting penetration by a select penetrator, comprising a solids layer bonded by a bonding layer to a flexible fiber layer, said solids layer configured with multiple intersecting critical gap segments with a uniform gap width of at least 50% of the thickness of said solid layer, said composite material having a surface area unit weight not more than 1.2 lb/ft2, said multiple intersecting critical gap segments defining solids layer elements, said bonding layer comprising a bonding interface between the full underside surface area of said solids layer elements and the fibers of the mating surface area of said flexible fiber layer, said bonding layer having at least 500 psi of shear strength, said fiber layer having a tensile strength greater than 10 GPD, said gap comprising multiple intersecting gaps, said intersections dividing said gaps into gap segments, said intersecting gaps having intersect angles of at least 60 degrees, each said gap segment being oriented substantially perpendicular to a common threadline direction in said fiber layer, and said solids layer having a thickness of between 0.01 and 0.04 inches inclusive.

19. A solid and fiber composite material according to claim 11, wherein deflection in the critical gap at said tensile breaking strength of said fiber layer is less than 20%.

20. A solid and fiber composite material according to claim 1, wherein said material resists penetration of at least 150 N per mm² of compression force energy per unit area of penetrator contact area cross section.

21. A solid and fiber composite material for resisting penetration by a select penetrator, comprising a solids layer bonded by a bonding layer to a flexible fiber layer, said solids layer configured with a pattern of intersecting gap line segments, said gap line segments having a uniform critical cross section gap geometry wherein gap height is equal to the solids layer thickness and gap width is at least 50% of gap height, said intersecting critical gap segments defining solids layer elements, said bonding layer comprising a bonding interface between the full underside surface area of said solids layer elements and said flexible fiber layer, said bonding layer having at least 500 psi of shear strength.

22. A solid and fiber composite material according to claim 21, said fiber layer comprising fibers with tensile strength greater than 10 GPD.

23. A solid and fiber composite material according to claim 21, where the solid layer has a hardness at least 100% of the hardness of said select penetrator.

24. A solid and fiber composite material according to claim 21, said select penetrator being a knife edge penetrator.

25. A solid and fiber composite material according to claim 21, where said fiber layer has a tensile strength in a direction within 30 degrees perpendicular to a said gap line segment of at least 100% the anticipated force from said select penetrator.

26. A solid and fiber composite material according to claim 25, where elongation in said fiber layer at said at least 100% the anticipated force is not more than 2%.

27. A solid and fiber composite material according to claim 25, where said fiber layer has a tensile strength of at least 60 lbf.

28. A solid and fiber composite material according to claim 25, where said fiber layer has a tensile strength of 250 lbf.

29. A solid and fiber composite material according to claim 21, where the bonded fiber layer has a tensile strength of 6000 lbf.

30. A solid and fiber composite material according to claim 25, where the deflection in the gap at tensile breaking load is less than 20%.

31. A solid and fiber composite material as in claim 21, where the structure is capable of supporting at least 300 N per mm2 compression force energy per unit area of penetrator contact area cross section.

32. A solid and fiber composite material according to claim 21, with solid gap to fiber angles less than or equal 90 degrees and greater than 60 degrees.

33. A solid and fiber composite material according to claim 21, said flexible fiber layer comprising fibers of less than 400 denier.

34. A solid and fiber composite material according to claim 25, said flexible fiber layer comprising multiple fiber layers with at least one common threadline direction running within 30 degrees perpendicular to each said gap line segment, said bonding layer extending from the full underside surface area of said solids layer to the fibers of all said multiple fiber layers.

35. A solid and fiber composite material according to claim 25, further comprising a flexible shielding layer adjacent to said solids layer opposite said flexible fiber layer, said flexible shielding layer having an aerial density of between 10 and 25 ounces per square yard, inclusive.

36. A solid and fiber composite material according to claim 25, further comprising a flexible fabric underside layer adjacent to said flexible fiber layer opposite said solids layer, said flexible fabric underside layer comprising fibers with tensile strength greater than 10 GPD.

37. A solid and fiber composite material according to claim 1, said solids layer elements comprising hemmed edges.

38. A solid and fiber composite material according to claim 1, said solids layer elements comprising gap edge angles of less than 90 degrees upward from the plane of said solids layer part.

39. A solid and fiber composite material according to claim 1, said solids layer elements comprising a bonded laminate of at least a first and second layers of solid materials, said first layer being more brittle and less ductile than said second layer.

* * * * *